US012795677B2

United States Patent

(12) United States Patent
Dimou et al.

(10) Patent No.: US 12,795,677 B2
(45) Date of Patent: Nov. 10, 2026

(54) DOWNLINK CONTROL INFORMATION CONFIGURATION FOR TRIGGERING HYBRID AUTOMATIC REPEAT REQUEST CODEBOOK RETRANSMISSION

(71) Applicant: QUALCOMM Incorporated, San Diego, CA (US)

(72) Inventors: Konstantinos Dimou, New York, NY (US); Jing Sun, San Diego, CA (US); Yan Zhou, San Diego, CA (US); Tao Luo, San Diego, CA (US)

(73) Assignee: QUALCOMM Incorproated, San Diego, CA (US)

( * ) Notice: Subject to any disclaimer, the term of this patent is extended or adjusted under 35 U.S.C. 154(b) by 766 days.

(21) Appl. No.: 18/155,320

(22) Filed: Jan. 17, 2023

(65) Prior Publication Data

US 2023/0232412 A1 Jul. 20, 2023

Related U.S. Application Data

(60) Provisional application No. 63/266,973, filed on Jan. 20, 2022.

(51) Int. Cl.
*H04W 72/23* (2023.01)
*H04L 1/00* (2006.01)
(Continued)

(52) U.S. Cl.
CPC ........... *H04W 72/23* (2023.01); *H04L 1/0004* (2013.01); *H04L 1/1812* (2013.01); *H04W 72/1273* (2013.01)

(58) Field of Classification Search
CPC .............. H04W 72/23; H04W 72/1273; H04L 1/0004; H04L 1/1812; H04L 1/1825;
(Continued)

(56) References Cited

U.S. PATENT DOCUMENTS

2021/0105102 A1* 4/2021 Li .......................... H04L 1/1822
2022/0039140 A1* 2/2022 Yi ............................ H04L 1/08
(Continued)

OTHER PUBLICATIONS

China Telecom: "Discussion on Some Remaining Issues for UE HARQ-ACK Feedback Enhancements", 3GPP TSG RAN WG1 #107bis-e, R1-2200484, 3rd Generation Partnership Project, Mobile Competence Centre, 650, Route Des Lucioles, F-06921 Sophia-Antipolis Cedex, France, vol. RAN WG1, No. e-Meeting, Jan. 17, 2022-Jan. 25, 2022, Jan. 11, 2022, 3 Pages, XP052093223, pp. 1-2.
(Continued)

*Primary Examiner* — Hoang-Chuong Q Vu
(74) *Attorney, Agent, or Firm* — Harrity & Harrity, LLP

(57) ABSTRACT

Various aspects of the present disclosure generally relate to wireless communication. In some aspects, a user equipment (UE) may receive downlink control information (DCI) including a hybrid automatic repeat request (HARQ) acknowledgement (ACK) retransmission indicator field set to indicate one-shot HARQ codebook retransmission. The UE may transmit, based at least in part on receiving the DCI, a HARQ codebook retransmission for a slot HARQ offset associated with another field of the DCI. Numerous other aspects are described.

29 Claims, 17 Drawing Sheets

(51) Int. Cl.
*H04L 1/1812* (2023.01)
*H04W 72/1273* (2023.01)

(58) Field of Classification Search
CPC ... H04L 1/1858; H04L 1/0025; H04L 1/1854; H04L 1/1896
See application file for complete search history.

(56) References Cited

U.S. PATENT DOCUMENTS

| | | | | |
|---|---|---|---|---|
| 2022/0232592 | A1* | 7/2022 | Dimou | H04L 1/1685 |
| 2022/0408464 | A1* | 12/2022 | MolavianJazi | H04W 72/0453 |
| 2023/0046759 | A1* | 2/2023 | Wang | H04L 5/0053 |
| 2023/0139269 | A1* | 5/2023 | MolavianJazi | H04L 5/0094 370/329 |
| 2023/0345314 | A1* | 10/2023 | Harada | H04W 16/32 |
| 2023/0370209 | A1* | 11/2023 | Wang | H04L 1/1854 |
| 2024/0032031 | A1* | 1/2024 | Yi | H04W 72/1273 |
| 2024/0057108 | A1* | 2/2024 | Yi | H04L 1/1854 |
| 2024/0313855 | A1* | 9/2024 | Yao | H04B 7/18532 |
| 2024/0364479 | A1* | 10/2024 | Wang | H04L 5/0055 |
| 2024/0413951 | A1* | 12/2024 | Bae | H04L 1/1822 |
| 2025/0038896 | A1* | 1/2025 | Yan | H04L 1/1822 |
| 2025/0071779 | A1* | 2/2025 | Rossbach | H04L 1/1861 |
| 2025/0113353 | A1* | 4/2025 | Park | H04W 72/1268 |
| 2025/0141606 | A1* | 5/2025 | Bae | H04L 1/1854 |
| 2025/0323761 | A1* | 10/2025 | Löhr | H04W 72/232 |

OTHER PUBLICATIONS

International Search Report and Written Opinion—PCT/US2023/060819—ISA/EPO—Mar. 30, 2023.

Nokia., et al., "HARQ-ACK Feedback Enhancements for URLLC/IIoT", 3GPP TSG RAN WG1 #107-e, R1-2111139, 3rd Generation Partnership Project, Mobile Competence Centre, 650, Route Des Lucioles, F-06921 Sophia-Antipolis Cedex, France, vol. RAN WG1, No. e-Meeting, Nov. 11, 2021-Nov. 19, 2021, Nov. 5, 2021, 13 Pages, XP052074131, pp. 5-8.

Sony: "Remaining Issues in HARQ-ACK Enhancements for URLLC", 3GPP TSG RAN WG1 #107bis-e, R1-2200178, 3rd Generation Partnership Project, Mobile Competence Centre, 650, Route Des Lucioles, F-06921 Sophia-Antipolis Cedex, France, vol. RAN WG1, No. e-Meeting, Jan. 17, 2022-Jan. 25, 2022, Jan. 11, 2022, 6 Pages, XP052093020, pp. 2-3.

Qualcomm Incorporated: "HARQ-ACK enhancement for IOT and URLLC", 3GPP TSG RAN WG1 #107bis-e, R1-2200294, e-Meeting, Jan. 17, 2022-Jan. 25, 2022, Jan. 25, 2022, pp. 1-20.

* cited by examiner

DOWNLINK CONTROL INFORMATION CONFIGURATION FOR TRIGGERING HYBRID AUTOMATIC REPEAT REQUEST CODEBOOK RETRANSMISSION

CROSS-REFERENCE TO RELATED APPLICATION

This patent application claims priority to U.S. Provisional Patent Application No. 63/266,973, filed on Jan. 20, 2022, entitled “DOWNLINK CONTROL INFORMATION CONFIGURATION FOR TRIGGERING HYBRID AUTOMATIC REPEAT REQUEST CODEBOOK RETRANSMISSION,” and assigned to the assignee hereof. The disclosure of the prior application is considered part of and is incorporated by reference into this patent application.

INTRODUCTION

Aspects of the present disclosure generally relate to wireless communication and to techniques and apparatuses for downlink control information configuration.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. “Downlink” (or “DL”) refers to a communication link from the network node to the UE, and “uplink” (or “UL”) refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving downlink control information (DCI) including a hybrid automatic repeat request (HARQ) acknowledgement (ACK) retransmission indicator field set to indicate one-shot HARQ codebook retransmission. The method may include transmitting, based at least in part on receiving the DCI, a HARQ codebook retransmission for a slot HARQ offset associated with a modulation and coding scheme (MCS) field of the DCI.

Some aspects described herein relate to a method of wireless communication performed by a network node. The method may include transmitting DCI including a HARQ ACK retransmission indicator field set to indicate one-shot HARQ codebook retransmission. The method may include receiving, based at least in part on transmitting the DCI, a HARQ codebook retransmission for a slot HARQ offset associated with an MCS field of the DCI.

Some aspects described herein relate to a UE for wireless communication. The UE may include a memory and one or more processors coupled to the memory. The one or more processors may be configured to receive DCI including a HARQ ACK retransmission indicator field set to indicate one-shot HARQ codebook retransmission. The one or more processors may be configured to transmit, based at least in part on receiving the DCI, a HARQ codebook retransmission for a slot HARQ offset associated with an MCS field of the DCI.

Some aspects described herein relate to a network node for wireless communication. The network node may include a memory and one or more processors coupled to the memory. The one or more processors may be configured to transmit DCI including a HARQ ACK retransmission indicator field set to indicate one-shot HARQ codebook retransmission. The one or more processors may be configured to receive, based at least in part on transmitting the DCI, a HARQ codebook retransmission for a slot HARQ offset associated with an MCS field of the DCI.

Some aspects described herein relate to a non-transitory computer-readable medium that stores a set of instructions for wireless communication by a UE. The set of instructions, when executed by one or more processors of the UE, may cause the UE to receive DCI including a HARQ ACK retransmission indicator field set to indicate one-shot HARQ codebook retransmission. The set of instructions, when executed by one or more processors of the UE, may cause the UE to transmit, based at least in part on receiving the DCI, a HARQ codebook retransmission for a slot HARQ offset associated with an MCS field of the DCI.

Some aspects described herein relate to a non-transitory computer-readable medium that stores a set of instructions for wireless communication by a network node. The set of instructions, when executed by one or more processors of the network node, may cause the network node to transmit DCI including a HARQ ACK retransmission indicator field set to indicate one-shot HARQ codebook retransmission. The set of instructions, when executed by one or more processors of the network node, may cause the network node to receive, based at least in part on transmitting the DCI, a HARQ codebook retransmission for a slot HARQ offset associated with an MCS field of the DCI.

Some aspects described herein relate to an apparatus for wireless communication. The apparatus may include means for receiving DCI including a HARQ ACK retransmission indicator field set to indicate one-shot HARQ codebook retransmission. The apparatus may include means for transmitting, based at least in part on receiving the DCI, a HARQ codebook retransmission for a slot HARQ offset associated with an MCS field of the DCI.

Some aspects described herein relate to an apparatus for wireless communication. The apparatus may include means for transmitting DCI including a HARQ ACK retransmission indicator field set to indicate one-shot HARQ codebook retransmission. The apparatus may include means for receiving, based at least in part on transmitting the DCI, a HARQ codebook retransmission for a slot HARQ offset associated with an MCS field of the DCI.

Some aspects described herein relate to a method of wireless communication performed by a network node. The method may include transmitting DCI including a HARQ ACK retransmission indicator field set to indicate one-shot HARQ codebook retransmission. The method may include receiving, based at least in part on transmitting the DCI, a HARQ codebook retransmission for a slot HARQ offset associated with another field of the DCI.

Some aspects described herein relate to a method of wireless communication performed by a UE. The method may include receiving DCI including a HARQ ACK retransmission indicator field set to indicate one-shot HARQ codebook retransmission. The method may include transmitting, based at least in part on receiving the DCI, a HARQ codebook retransmission for a slot HARQ offset associated with another field of the DCI.

Some aspects described herein relate to a UE for wireless communication. The UE may include a memory and one or more processors coupled to the memory. The one or more processors may be configured to receive DCI including a HARQ ACK retransmission indicator field set to indicate one-shot HARQ codebook retransmission. The one or more processors may be configured to transmit, based at least in part on receiving the DCI, a HARQ codebook retransmission for a slot HARQ offset associated with another field of the DCI.

Some aspects described herein relate to a network node for wireless communication. The network node may include a memory and one or more processors coupled to the memory. The one or more processors may be configured to transmit DCI including a HARQ ACK retransmission indicator field set to indicate one-shot HARQ codebook retransmission. The one or more processors may be configured to receive, based at least in part on transmitting the DCI, a HARQ codebook retransmission for a slot HARQ offset associated with another field of the DCI.

Some aspects described herein relate to a non-transitory computer-readable medium that stores a set of instructions for wireless communication by a UE. The set of instructions, when executed by one or more processors of the UE, may cause the UE to receive DCI including a HARQ ACK retransmission indicator field set to indicate one-shot HARQ codebook retransmission. The set of instructions, when executed by one or more processors of the UE, may cause the UE to transmit, based at least in part on receiving the DCI, a HARQ codebook retransmission for a slot HARQ offset associated with another field of the DCI.

Some aspects described herein relate to a non-transitory computer-readable medium that stores a set of instructions for wireless communication by a network node. The set of instructions, when executed by one or more processors of the network node, may cause the network node to transmit DCI including a HARQ ACK retransmission indicator field set to indicate one-shot HARQ codebook retransmission. The set of instructions, when executed by one or more processors of the network node, may cause the network node to receive, based at least in part on transmitting the DCI, a HARQ codebook retransmission for a slot HARQ offset associated with another field of the DCI.

Some aspects described herein relate to an apparatus for wireless communication. The apparatus may include means for receiving DCI including a HARQ ACK retransmission indicator field set to indicate one-shot HARQ codebook retransmission. The apparatus may include means for transmitting, based at least in part on receiving the DCI, a HARQ codebook retransmission for a slot HARQ offset associated with another field of the DCI.

Some aspects described herein relate to an apparatus for wireless communication. The apparatus may include means for transmitting DCI including a HARQ ACK retransmission indicator field set to indicate one-shot HARQ codebook retransmission. The apparatus may include means for receiving, based at least in part on transmitting the DCI, a HARQ codebook retransmission for a slot HARQ offset associated with another field of the DCI.

Aspects generally include a method, apparatus, system, computer program product, non-transitory computer-readable medium, user equipment, base station, network entity, network node, wireless communication device, and/or processing system as substantially described with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
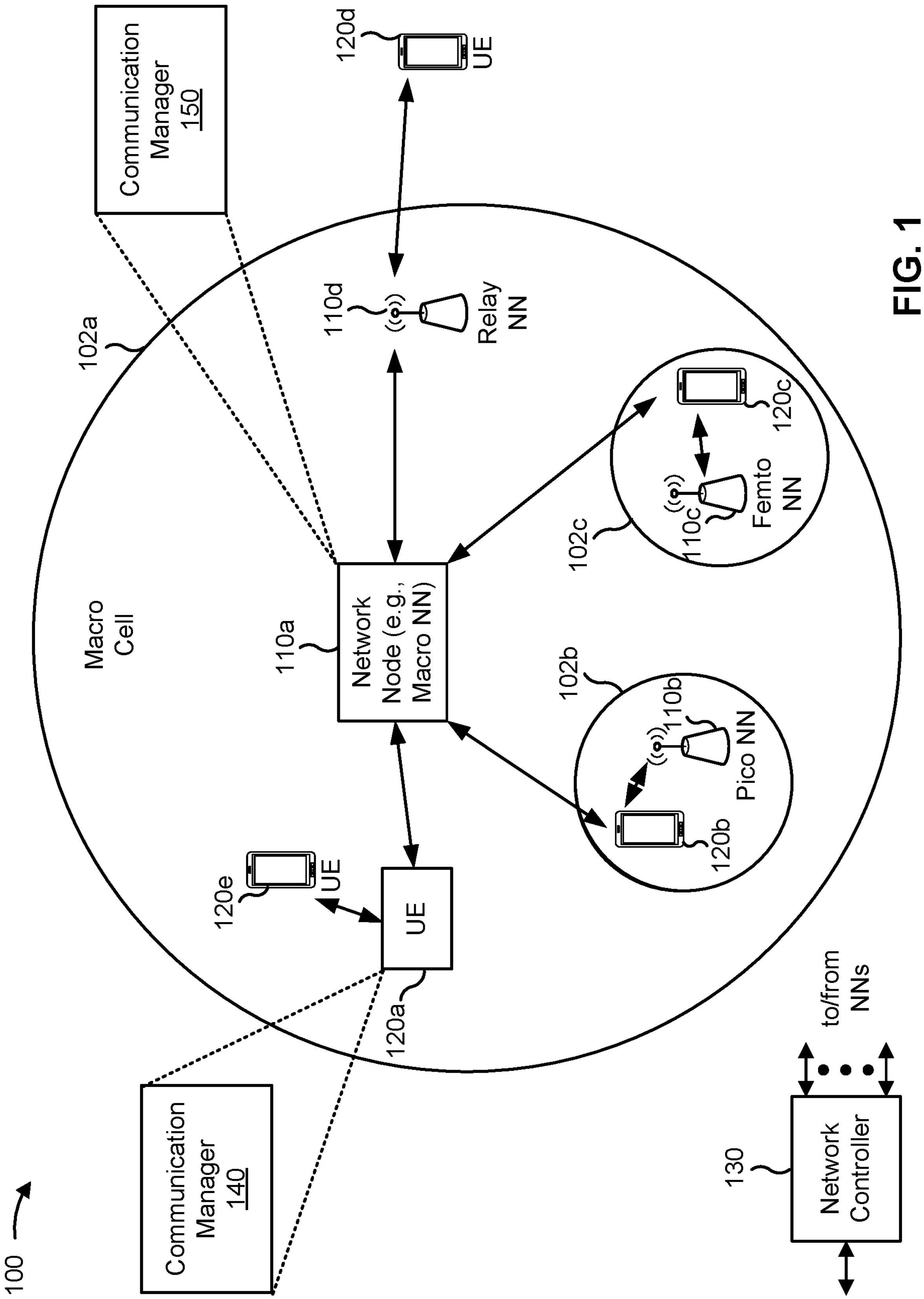
FIG. 1 is a diagram illustrating an example of a wireless network, in accordance with the present disclosure.

Hybrid automatic repeat request (HARQ) is a redundancy technique in which a first wireless communication device, such as a user equipment (UE), can transmit a feedback message, such as a HARQ acknowledgment (ACK) or a HARQ negative acknowledgment (NACK), to indicate whether the first wireless communication device has successfully received a communication from a second wireless communication device, such as a network node. For example, a network node may attempt to transmit a downlink communication to a UE and the UE may attempt to receive and decode the communication. When the UE is successful at receiving and decoding the communication, the UE transmits a HARQ ACK to indicate success. When the UE is unsuccessful at receiving and/or decoding the communication, the UE transmits a HARQ NACK to indicate a lack of success and to trigger a retransmission of the communication. The UE may determine a lack of success at receiving and decoding the communication based at least in part on the communication not being detected in a resource for which the communication was scheduled or based at least in part on a failure of a checksum, among other examples.

One example of a communication for which HARQ may be used is for physical downlink shared channel (PDSCH) communication. A network node may transmit, using scheduled resources, physical downlink shared channel (PDSCH) communications with corresponding HARQ process identifiers (IDs). The PDSCH communications may trigger transmission of HARQ feedback, which may be termed a "HARQ codebook transmission" or a "HARQ ACK" codebook transmission.

In a first slot n, a UE may cancel a set of HARQ codebook transmissions. A HARQ codebook transmission, which may be termed "HARQ ACK codebook transmissions" may include a feedback message that the UE is to transmit to a network node to provide feedback regarding, for example, downlink data transmission (e.g., a PDSCH). A HARQ codebook transmission may include a feedback message that the UE is to transmit to a network node to provide feedback regarding, for example, downlink data transmission (PDSCH). The UE may cancel the set of HARQ codebook transmissions as a result of network congestion and/or a lack of allocated resources, among other examples. In another example, the UE may cancel transmission of the set of HARQ codebook transmissions as a result of an occurrence of another communication with a higher priority than the set of HARQ codebook transmissions. The network node may transmit downlink control information (DCI) to trigger retransmission of the set of HARQ codebook transmissions. Such a retransmission of a the set of HARQ codebook transmissions may be termed a "HARQ codebook retransmission."

A UE may be configured with different types of codebooks, such as a Type-1 HARQ ACK codebook or a Type-2 HARQ ACK codebook. Additional details regarding some HARQ ACK codebooks can be found in, for example, 3GPP Technical Specification (TS) 38.213, Release (Rel.) 17, Version 17.3.0. Another type of HARQ ACK codebook that the UE may support is an enhanced Type-3 HARQ ACK Codebook, which may have a smaller size relative to other HARQ ACK codebooks defined for Rel. 16.

DCIs may have different formats for providing different types of information and/or for providing implicit indications to a UE. For example, a UE may interpret fields of a first format of DCI in a first manner (e.g., conveying first parameters) and fields of a second format of DCI in a second manner (e.g., conveying second parameters). Additionally, or alternatively, the UE may interpret a first format of DCI as being for a first purpose (e.g., scheduling resources for a first type of transmission) and a second format of DCI as being for a second purpose (e.g., altering a power state of the UE). A number of different DCI formats have been agreed to and standardized by 3GPP, such as in 3GPP TS 38.212, version 17.3.0 or 3GPP TS 38.213 version 17.3.0, among other specifications.

Some formats of DCI, such as DCI formats 1_1 and 1_2 may include fields for indicating parameters relating to HARQ codebook retransmission. For example, some DCIs may include a field for conveying a request for HARQ codebook retransmission and/or an offset indicator field for conveying an offset value associated with the HARQ codebook retransmission. A transport block of a DCI format may include an MCS field, an NDI field, and/or an RV field, among other examples. When a UE receives DCI that includes a request for HARQ codebook retransmission, the UE may determine an offset value for the HARQ codebook retransmission based on a field in the DCI. The offset value identifies a slot for which one or more HARQ codebook transmissions are to be retransmitted. In other words, when the UE receives the DCI in a second slot m, an offset indicator provides an offset value from which the UE can identify the first slot n (in which HARQ codebook transmissions were canceled) for which a HARQ codebook retransmission is to occur. In some examples, the network node may include a dedicated field, in the DCI, to identify the offset value. This may result in some signaling overhead for indicating the offset value for the HARQ codebook retransmission.

It has been proposed that a DCI may trigger the UE to perform one-shot HARQ feedback (which may also be referred to as "one-shot HARQ codebook retransmission" with regard to a retransmission of HARQ feedback). In one-shot HARQ codebook retransmission, the UE reports HARQ ACKs for one or more HARQ processes of a cell via a single HARQ feedback transmission. In this case, the DCI may include a dedicated field for triggering one-shot HARQ feedback. According to one or more examples, conveying both a first dedicated field for triggering one-shot HARQ feedback and a second dedicated field for identifying the offset value may result in excessive signaling overhead.

Accordingly, some aspects described herein enable repurposing of another field of a DCI for conveying an offset value rather than using a dedicated offset indicator field. When one-shot HARQ feedback is triggered, some other fields of some DCI formats may become unnecessary. Accordingly, according to one or more examples, some aspects described herein use other fields or combinations of fields to identify an offset value (e.g., for determining to which HARQ codebook processes and associated HARQ codebook transmissions a DCI triggering a HARQ codebook retransmission is applicable).

Some aspects described herein enable a UE to determine an offset value for a HARQ codebook retransmission based at least in part on interpreting a field of DCI (e.g., DCI that triggers one-shot HARQ feedback). For example, the UE may receive DCI with a HARQ ACK retransmission indicator field. Based at least in part on decoding the HARQ ACK retransmission indicator field to determine that one-shot HARQ codebook retransmission is triggered, the UE may determine the offset based at least in part on one or more other fields, such as a modulation and coding scheme (MCS) field, a new data indicator (NDI) field, a redundancy version (RV) field, a frequency domain resource allocation (FDRA) field, or an antenna port identifier field, among other examples. For example, for one-shot triggering of HARQ ACK retransmission, a HARQ offset indicator may be based at least in part on an MCS field. In other words, in one or more examples, bits of the MCS field can be interpreted as a value for the HARQ offset indicator rather than as a value for an MCS.

In some aspects, the UE may interpret one or more DCI fields to determine whether a PDSCH is scheduled by the DCI. For example, when a DCI field triggering the one-shot HARQ codebook retransmission is triggered, the UE may determine that the DCI does not schedule a PDSCH transmission. According to one or more examples, this behavior may correspond to operation in Type-3 HARQ ACK codebook communication, which is described in more detail in 3GPP TS 38.212, version 17.3.0.

In some aspects, the UE may request Type-3 HARQ codebook retransmission to retrieve canceled HARQ codebook transmissions. For example, when the UE receives many requests (e.g., greater than a threshold quantity of requests) for HARQ codebook transmission within a period of time, the UE may request to switch to Type-3 HARQ codebook retransmission. In Type-3 HARQ codebook retransmission, the network node consolidates multiple retransmission indicators (e.g., in multiple DCI) into a single retransmission indicator (or multiple retransmission indicators) within a single DCI. In one or more examples, the network node will skip one or more DCI transmissions when the UE has requested a switch to Type-3 HARQ codebook retransmission. Based at least in part on the network node skipping one or more DCI transmissions, the UE can skip monitoring physical downlink control channel (PDCCH) occasions for the one or more DCI transmissions.

In this way, the network node reuses existing DCI fields and the UE interprets the reused existing DCI fields to determine an offset value for HARQ codebook retransmission. This saves signaling overhead for indicating the offset value. Further, by switching to Type-3 HARQ codebook retransmission after receiving many requests for HARQ codebook transmission within a period of time, the UE saves a number of physical downlink control channel (PDCCH) monitoring occasions that the UE is to monitor and the network node saves a number of DCI transmissions. This may save power utilization and save network overhead relative to continuing to use another type of HARQ codebook retransmission behavior.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110*a*, a network node 110*b*, a network node 110*c*, and a network node 110*d*), a UE

120 or multiple UEs 120 (shown as a UE 120*a*, a UE 120*b*, a UE 120*c*, a UE 120*d*, and a UE 120*e*), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110*a* may be a macro network node for a macro cell 102*a*, the network node 110*b* may be a pico network node for a pico cell 102*b*, and the network node 110*c* may be a femto network node for a femto cell 102*c*. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110*d* (e.g., a relay network node) may communicate with the network node 110*a* (e.g., a macro network node) and the UE 120*d* in order to facilitate communication between the network node 110*a* and the UE 120*d*. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

The electromagnetic spectrum is often subdivided, by frequency/wavelength, into various classes, bands, channels, etc. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive DCI including a HARQ ACK retransmission indicator field set to indicate one-shot HARQ codebook retransmission; and transmit, based at least in part on receiving the DCI, a HARQ codebook retransmission for a slot HARQ offset associated with another field of the DCI. Additionally, or alternatively, the communication manager 140 may receive DCI including a HARQ ACK retransmission indicator field set to indicate one-shot HARQ codebook retransmission; and transmit, based at least in part on receiving the DCI, a HARQ codebook retransmission for a slot HARQ offset associated with an MCS field of the DCI. Additionally, or alternatively, the communication manager 140 may perform one or more other operations described herein.

In some aspects, the network node 110 may include a communication manager 150. As described in more detail elsewhere herein, the communication manager 150 may transmit DCI including a HARQ ACK retransmission indicator field set to indicate one-shot HARQ codebook retransmission; and receive, based at least in part on transmitting the DCI, a HARQ codebook retransmission for a slot HARQ offset associated with another field of the DCI. Additionally, or alternatively, the communication manager 150 may transmit DCI including a HARQ ACK retransmission indicator field set to indicate one-shot HARQ codebook retransmission; and receive, based at least in part on transmitting the DCI, a HARQ codebook retransmission for a slot HARQ offset associated with an MCS field of the DCI. Additionally, or alternatively, the communication manager 150 may perform one or more other operations described herein.

As indicated above, FIG. 1 is provided as an example. Other examples may differ from what is described with regard to FIG. 1.

Figure 2:
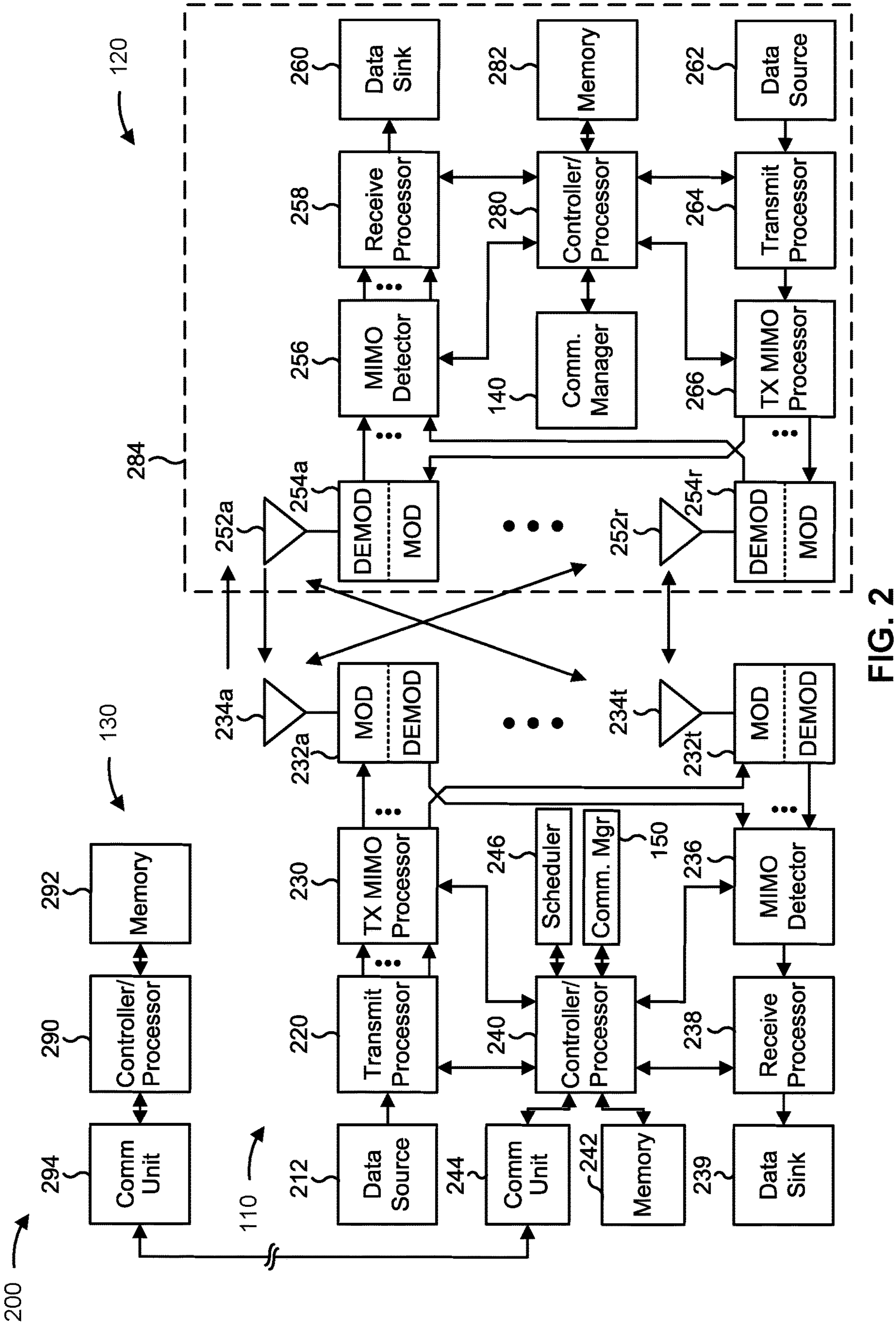
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234*a* through 234*t*, such as T antennas (T≥1). The UE 120 may be equipped with a set of antennas 252*a* through 252*r*, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more MCSs for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232*a* through 232*t*. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232*a* through 232*t* may transmit a set of downlink signals (e.g., T downlink signals) via a corresponding set of antennas 234 (e.g., T antennas), shown as antennas 234*a* through 234*t*.

At the UE 120, a set of antennas 252 (shown as antennas 252*a* through 252*r*) may receive the downlink signals from the network node 110 and/or other network nodes 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein.

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein.

The controller/processor 240 of the network node 110, the controller/processor 280 of the UE 120, and/or any other component(s) of FIG. 2 may perform one or more techniques associated with DCI configuration for triggering HARQ codebook retransmission, as described in more detail elsewhere herein. For example, the controller/processor 240 of the network node 110, the controller/processor 280 of the UE 120, and/or any other component(s) of FIG. 2 may perform or direct operations of, for example, process 700 of FIG. 7, process 800 of FIG. 8, process 1600 of FIG. 16, process 1700 of FIG. 17, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 700 of FIG. 7, process 800 of FIG. 8, process 1600 of FIG. 16, process 1700 of FIG. 17, and/or other processes as described herein. In some examples, executing instructions may include running the instructions, converting the instructions, compiling the instructions, and/or interpreting the instructions, among other examples.

In some aspects, the UE includes means for receiving DCI including a HARQ ACK retransmission indicator field set to indicate one-shot HARQ codebook retransmission; and/or means for transmitting, based at least in part on receiving the DCI, a HARQ codebook retransmission for a slot HARQ offset associated with another field of the DCI. Additionally, or alternatively, the UE includes means for receiving DCI including a HARQ ACK retransmission indicator field set to indicate one-shot HARQ codebook retransmission; and/or means for transmitting, based at least in part on receiving the DCI, a HARQ codebook retransmission for a slot HARQ offset associated with an MCS field of the DCI. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network node includes means for transmitting DCI including a HARQ ACK retransmission indicator field set to indicate one-shot HARQ codebook retransmission; and/or means for receiving, based at least in part on transmitting the DCI, a HARQ codebook retransmission for a slot HARQ offset associated with another field of the DCI. Additionally, or alternatively, the network node includes means for transmitting DCI including a HARQ ACK retransmission indicator field set to indicate one-shot HARQ codebook retransmission; and/or means for receiving, based at least in part on transmitting the DCI, a HARQ codebook retransmission for a slot HARQ offset associated with an MCS field of the DCI. The means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. “Network entity” or “network node” may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
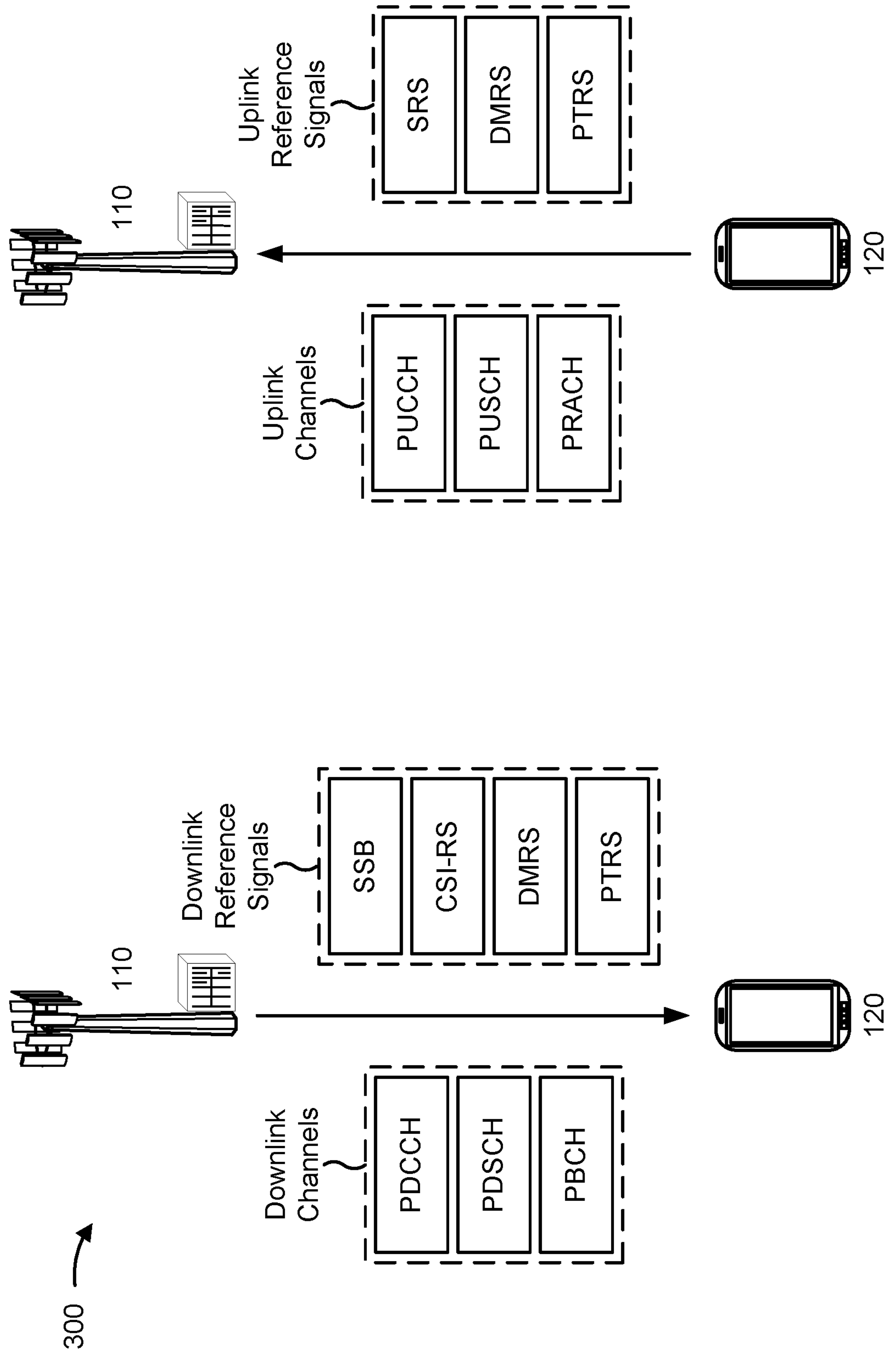
FIG. 3 is a diagram illustrating an example of physical channels and reference signals in a wireless network, in accordance with the present disclosure.

FIG. 3 is a diagram illustrating an example 300 of physical channels and reference signals in a wireless network, in accordance with the present disclosure. As shown in FIG. 3, downlink channels and downlink reference signals may carry information from a network node 110 (e.g., the network node 110*a*) to a UE 120 (e.g., the UE 120*a*), and uplink channels and uplink reference signals may carry information from a UE 120 to a network node 110.

As shown, a downlink channel may include a PDCCH that carries DCI, a PDSCH that carries downlink data, or a physical broadcast channel (PBCH) that carries system information, among other examples. In some examples, the DCI may convey a request for retransmission of a canceled HARQ codebook transmission, as described in more detail below. For example, when a network node 110 does not receive HARQ codebook transmissions for a set of HARQ processes, the network node 110 may conclude that the UE 120 canceled the HARQ codebook transmissions and may transmit DCI to request HARQ codebook retransmissions (of the canceled HARQ codebook transmissions). In some aspects, PDSCH communications may be scheduled by PDCCH communications.

As further shown, an uplink channel may include a physical uplink control channel (PUCCH) that carries uplink control information (UCI), a physical uplink shared channel (PUSCH) that carries uplink data, or a physical random access channel (PRACH) used for initial network access, among other examples. In some aspects, the UE 120 may transmit HARQ ACK or negative acknowledgement (NACK) feedback (e.g., ACK/NACK feedback or ACK/NACK information) in UCI on the PUCCH and/or the PUSCH. Each instance of HARQ ACK feedback or HARQ NACK feedback may be conveyed in a HARQ codebook transmission in UCI (e.g., on the PUCCH and/or the PUSCH). For example, as described in more detail below, the UE may be triggered to transmit a HARQ codebook transmission of a HARQ ACK. In some examples, the UE cancels transmission of the HARQ codebook transmission (e.g., as a result of network congestion), but may later transmits a HARQ codebook retransmission (of the canceled HARQ codebook transmission) to convey the HARQ ACK.

As further shown, a downlink reference signal may include a synchronization signal block (SSB), a channel state information (CSI) reference signal (CSI-RS), a DMRS, a positioning reference signal (PRS), or a phase tracking reference signal (PTRS), among other examples. As also shown, an uplink reference signal may include a sounding reference signal (SRS), a DMRS, or a PTRS, among other examples.

An SSB may carry information used for initial network acquisition and synchronization, such as a PSS, an SSS, a PBCH, and a PBCH DMRS. An SSB is sometimes referred to as a synchronization signal/PBCH (SS/PBCH) block. In some aspects, the network node 110 may transmit multiple SSBs on multiple corresponding beams, and the SSBs may be used for beam selection.

A CSI-RS may carry information used for downlink channel estimation (e.g., downlink CSI acquisition), which may be used for scheduling, link adaptation, or beam management, among other examples. The network node 110 may configure a set of CSI-RSs for the UE 120, and the UE 120 may measure the configured set of CSI-RSs. Based at least in part on the measurements, the UE 120 may perform channel estimation and may report channel estimation parameters to the network node 110 (e.g., in a CSI report), such as a CQI, a precoding matrix indicator (PMI), a CSI-RS resource indicator (CRI), a layer indicator (LI), a rank indicator (RI), or an RSRP, among other examples. The network node 110 may use the CSI report to select transmission parameters for downlink communications to the UE 120, such as a number of transmission layers (e.g., a rank), a precoding matrix (e.g., a precoder), an MCS, or a refined downlink beam (e.g., using a beam refinement procedure or a beam management procedure), among other examples.

A DMRS may carry information used to estimate a radio channel for demodulation of an associated physical channel (e.g., PDCCH, PDSCH, PBCH, PUCCH, or PUSCH). The design and mapping of a DMRS may be specific to a physical channel for which the DMRS is used for estimation. DMRSs are UE-specific, can be beamformed, can be confined in a scheduled resource (e.g., rather than transmitted on a wideband), and can be transmitted only when necessary. As shown, DMRSs are used for both downlink communications and uplink communications.

A PTRS may carry information used to compensate for oscillator phase noise. Typically, the phase noise increases as the oscillator carrier frequency increases. Thus, PTRS can be utilized at high carrier frequencies, such as millimeter wave frequencies, to mitigate phase noise. The PTRS may be used to track the phase of the local oscillator and to enable suppression of phase noise and common phase error (CPE). As shown, PTRSs are used for both downlink communications (e.g., on the PDSCH) and uplink communications (e.g., on the PUSCH).

A PRS may carry information used to enable timing or ranging measurements of the UE 120 based on signals transmitted by the network node 110 to improve observed time difference of arrival (OTDOA) positioning performance. For example, a PRS may be a pseudo-random Quadrature Phase Shift Keying (QPSK) sequence mapped in diagonal patterns with shifts in frequency and time to avoid collision with cell-specific reference signals and control channels (e.g., a PDCCH). In general, a PRS may be designed to improve detectability by the UE 120, which may need to detect downlink signals from multiple neighboring network nodes in order to perform OTDOA-based positioning. Accordingly, the UE 120 may receive a PRS from multiple cells (e.g., a reference cell and one or more neighbor cells), and may report a reference signal time difference (RSTD) based on OTDOA measurements associated with the PRSs received from the multiple cells. In some aspects, the network node 110 may then calculate a position of the UE 120 based on the RSTD measurements reported by the UE 120.

An SRS may carry information used for uplink channel estimation, which may be used for scheduling, link adaptation, precoder selection, or beam management, among other examples. The network node 110 may configure one or more SRS resource sets for the UE 120, and the UE 120 may transmit SRSs on the configured SRS resource sets. An SRS resource set may have a configured usage, such as uplink CSI acquisition, downlink CSI acquisition for reciprocity-based operations, uplink beam management, among other examples. The network node 110 may measure the SRSs, may perform channel estimation based at least in part on the measurements, and may use the SRS measurements to configure communications with the UE 120.

As indicated above, FIG. 3 is provided as an example. Other examples may differ from what is described with regard to FIG. 3.

Figure 4:
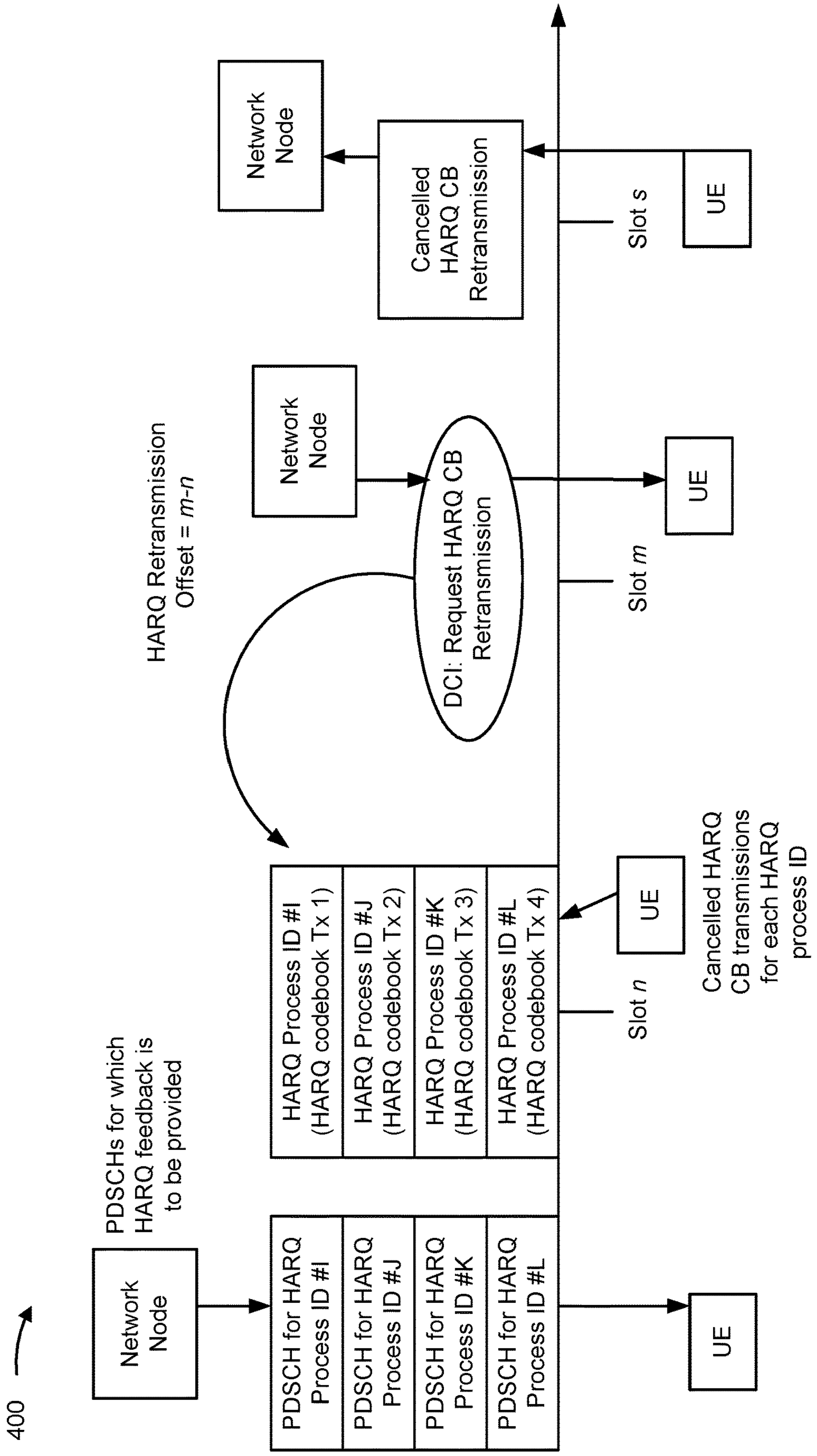
FIG. 4 is a diagram illustrating an example of triggered hybrid automatic repeat request (HARQ) codebook retransmission, in accordance with the present disclosure.

FIG. 4 is a diagram illustrating an example 400 of triggered HARQ codebook retransmission, in accordance with the present disclosure.

As shown in FIG. 4, in a first slot n, a UE (which may correspond to the UE 120*a*) may be associated with a set of canceled HARQ codebook transmissions, which may also be termed "HARQ ACK codebook transmissions." For example, the UE may cancel the set of HARQ codebook transmissions when the UE has not been scheduled with resources for transmitting the set of HARQ codebook transmissions, a network is congested, or a higher priority communication is scheduled to occur in the same resource as is scheduled for the set of HARQ codebook transmissions. A HARQ codebook transmission may include a feedback message (e.g., a HARQ ACK) that the UE is to transmit to a network node (which may correspond to the network node 110*a*) to provide feedback regarding, for example, downlink data transmission (e.g., a PDSCH). For example, the UE may be configured to transmit HARQ codebook transmissions (e.g., corresponding to the HARQ process identifiers (IDs) I-L, as shown), but may cancel the HARQ codebook transmissions as a result of network congestion and/or a lack of allocated resources, among other examples.

The set of HARQ codebook transmissions (e.g., HARQ codebook Tx 1-4, as shown) may be associated with a corresponding set of HARQ process identifiers. For example, as shown in FIG. 4, the set of HARQ codebook transmissions may have an association with HARQ process identifiers I, J, K, and L. The HARQ process identifiers may correspond to a set of HARQ processes configured for HARQ feedback (e.g., a HARQ ACK) for the UE.

Some UEs may support retransmission of canceled HARQ codebook transmissions, such as using triggered HARQ ACK codebook retransmission, which may also be termed "triggered HARQ codebook retransmission." In such cases, the UEs may transmit HARQ codebook retransmissions based at least in part on receiving a request from, for example, a network node. An enhancement to triggered HARQ ACK codebook retransmission is one-shot HARQ ACK retransmission (which may also be termed "one shot HARQ codebook retransmission"). In one-shot HARQ ACK retransmission, the UE may retransmit one or more HARQ codebook transmissions for a cell (e.g., a network node) based at least in part on a received request form a network node. In one or more examples, DCI may include a downlink assignment to trigger HARQ codebook retransmission using a PUCCH resource. In one-shot HARQ ACK retransmission, a triggering DCI dynamically indicates a HARQ retransmission offset, which may identify an offset in a quantity of PUCCH slots or sub-slots between the triggering DCI and a PUCCH slot or sub-slot of a HARQ ACK codebook that is to be retransmitted.

The UE may determine that the DCI includes the request for one-shot HARQ ACK retransmission based at least in part on a one-bit triggering DCI field. For example, the DCI may convey a field that, when set to a value '1', indicates that the DCI is scheduling one-shot HARQ ACK retransmission and that the DCI is not scheduling a PDSCH. In contrast, when the field is set to a value '0', the field indicates that the DCI is scheduling a PDSCH. Examples of DCI formats that may include a one-shot HARQ ACK retransmission indication field include DCI format 1_1 and DCI format 1_2.

As further shown in FIG. 4, in a second slot m, the UE may receive a request for HARQ codebook retransmission. For example, the UE may receive the request in DCI from a network node. The request may include information indicating that the request is applicable to HARQ codebook transmissions of slot n. For example, the request may include a HARQ retransmission offset identifier with a value for a field. The value for the field may indicate an offset between the slot in which the request is transmitted (slot m) and a slot to which the request applies (slot n). In other words, a value of '5' may indicate that slot n occurs 5 slots before slot m. Additionally, or alternatively, another parameter, which may be termed "k" may be defined that may further affect the offset value, such that, if the value of k is set to, for example, 1', the value of '4' for n would indicate that slot n occurs 4+1=5 slots before slot m. The value of k may be set statically (e.g., using radio resource control signaling) to reduce an amount of bits in the DCI to signal the offset value. The UE can determine which HARQ codebook transmissions are to be retransmitted in accordance with the request using the offset value (and the VC value, if configured). One technique for indicating the offset identifier is to use a dedicated field.

As further shown in FIG. 4, in a third slot s, the UE may retransmit the HARQ codebook transmissions. The retransmissions of canceled HARQ codebook transmissions may be termed "HARQ codebook retransmissions" as described above. For example, the UE may use time and frequency resources of slots for a HARQ codebook retransmission of the HARQ codebook transmissions based at least in part on the request received in slot m.

As indicated above, FIG. 4 is provided as an example. Other examples may differ from what is described with respect to FIG. 4.

Figure 5:
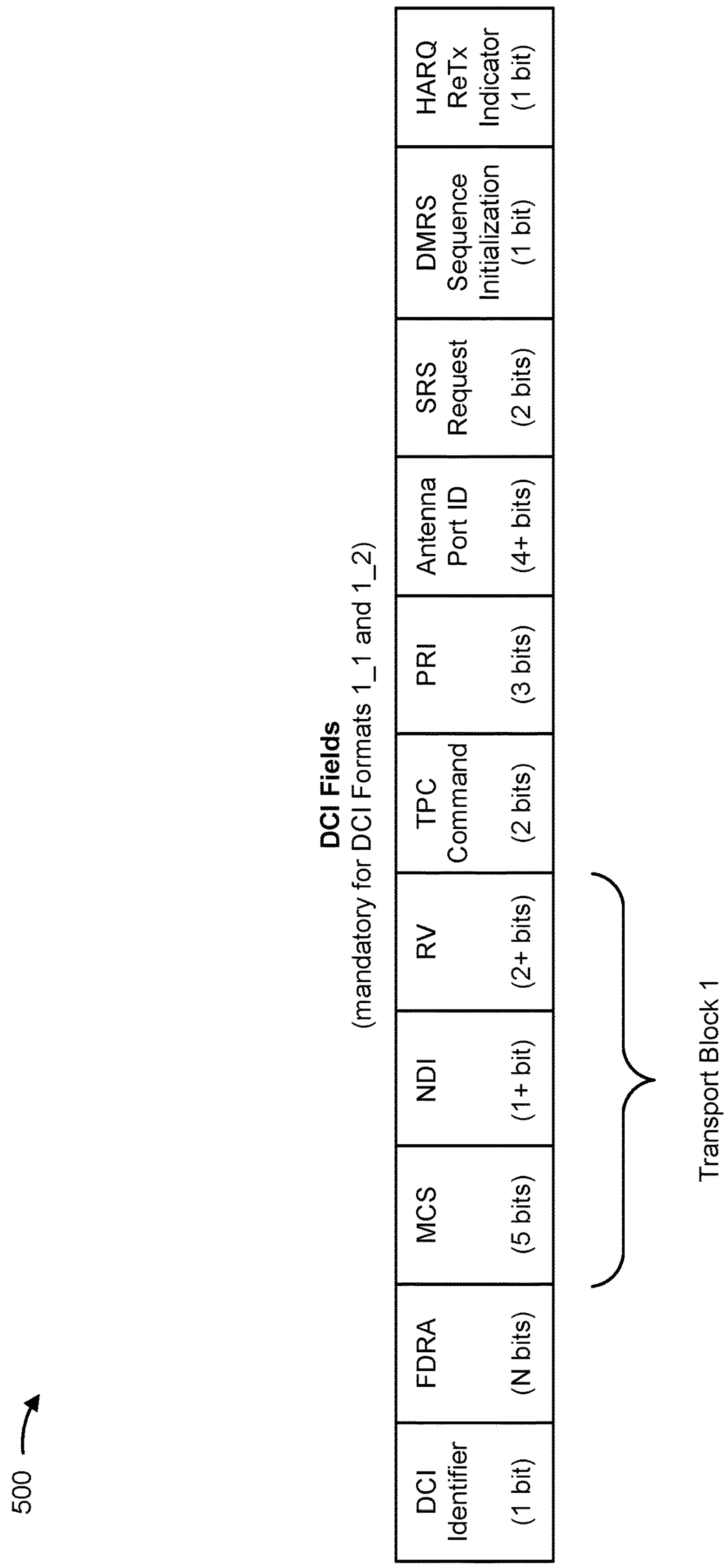
FIG. 5 is a diagram illustrating an example of downlink control information (DCI) fields, in accordance with the present disclosure.

FIG. 5 is a diagram illustrating an example 500 of DCI fields, in accordance with the present disclosure.

As shown in FIG. 5, DCI may include a set of configurable fields that a network node (such as the network node 110) may set to different values to convey information to a UE (such as the UE 120). For example, the DCI may include a DCI identifier field (1 bit), an FDRA field (N bits where Nis greater than or equal to 1), an MCS field (5 bits), an NDI field (at least 1 bit), an RV field (at least 2 bits), a transmit power control (TPC) command field (2 bits), a PUCCH resource indicator (PRI) field (3 bits), an antenna port identifier field (at least 4 bits), an SRS request field (2 bits), a DMRS sequence initialization field (1 bit), or a combination thereof. In some cases, as described above, the DCI may include a HARQ retransmission (ReTx) indicator field for indicating a one-shot HARQ ACK retransmission (1 bit), as described above. Additional details regarding DCI may be found, for example, in 3GPP TS 38.321, Rel. 17, Version 16.7.0.

In some cases and for some DCI formats, such as DCI formats 1_1 and 1_2, a first transport block may include the MCS field, the NDI, field, and the RV field, which may be mandatory fields. The fields that are included in DCI may be based at least in part on a configuration. For example, a field for a one-shot HARQ ACK retransmission request or a HARQ ACK retransmission indicator field, among other examples, may be included in DCI based at least in part on whether a Type-3 HARQ codebook or triggered HARQ codebook retransmission, among other examples, is configured. However, different combinations of fields may be used to identify an offset for determining to which HARQ codebook processes and associated HARQ codebook transmissions a DCI triggering a HARQ ACK codebook retransmission is applicable.

As indicated above, FIG. 5 is provided as an example. Other examples may differ from what is described with respect to FIG. 5.

Some aspects described herein enable a UE to determine an offset value, which may be termed a "slot HARQ offset," for a HARQ codebook retransmission based at least in part on received DCI. For example, the UE, which is configured for triggered HARQ codebook retransmission, may receive DCI with a HARQ ACK retransmission indicator field. The indicator field may be a single bit of DCI. Based at least in part on decoding the HARQ ACK retransmission indicator field to determine that one-shot HARQ codebook retransmission is triggered, the UE may determine the offset value based at least in part on one or more other fields, such as an MCS field, an NDI field, an RV field, an FDRA field, an antenna port identifier field, or a combination thereof. In some examples, the UE may determine the offset value by reinterpreting a field that is allocated for a different purpose. For example, the UE may interpret bits of an MCS field as indicating the offset value. Additionally, or alternatively, the UE may interpret bits of the NDI field, RV field, FDRA field, MCS field, or a combination thereof as indicating the offset value. In this way, the UE enables reuse of existing DCI fields, thereby improving signaling overhead efficiency for indicating the offset value.

Additionally, or alternatively, the UE may whether a PDSCH is scheduled by the DCI based at least in part on an interpretation of one or more DCI fields. For example, when a DCI field triggering the one-shot HARQ codebook retransmission is set to a particular value (e.g., toggled from a '0' to '1' to indicate that one-shot HARQ codebook retransmission is triggered), the UE may determine that the DCI does not schedule a PDSCH transmission. This behavior, which is being applied to one-shot HARQ codebook retransmission, corresponds to a behavior that is used for Rel. 16 Type-3 HARQ ACK codebook communication. In some aspects, the UE may request that the network node and the UE switch to Type-3 HARQ codebook retransmission. In type-3 HARQ codebook retransmission, the UE may monitor fewer PDCCH monitoring occasions to receive DCI triggering HARQ codebook retransmissions. This may reduce power utilization and network overhead for HARQ codebook retransmission.

Figure 6:
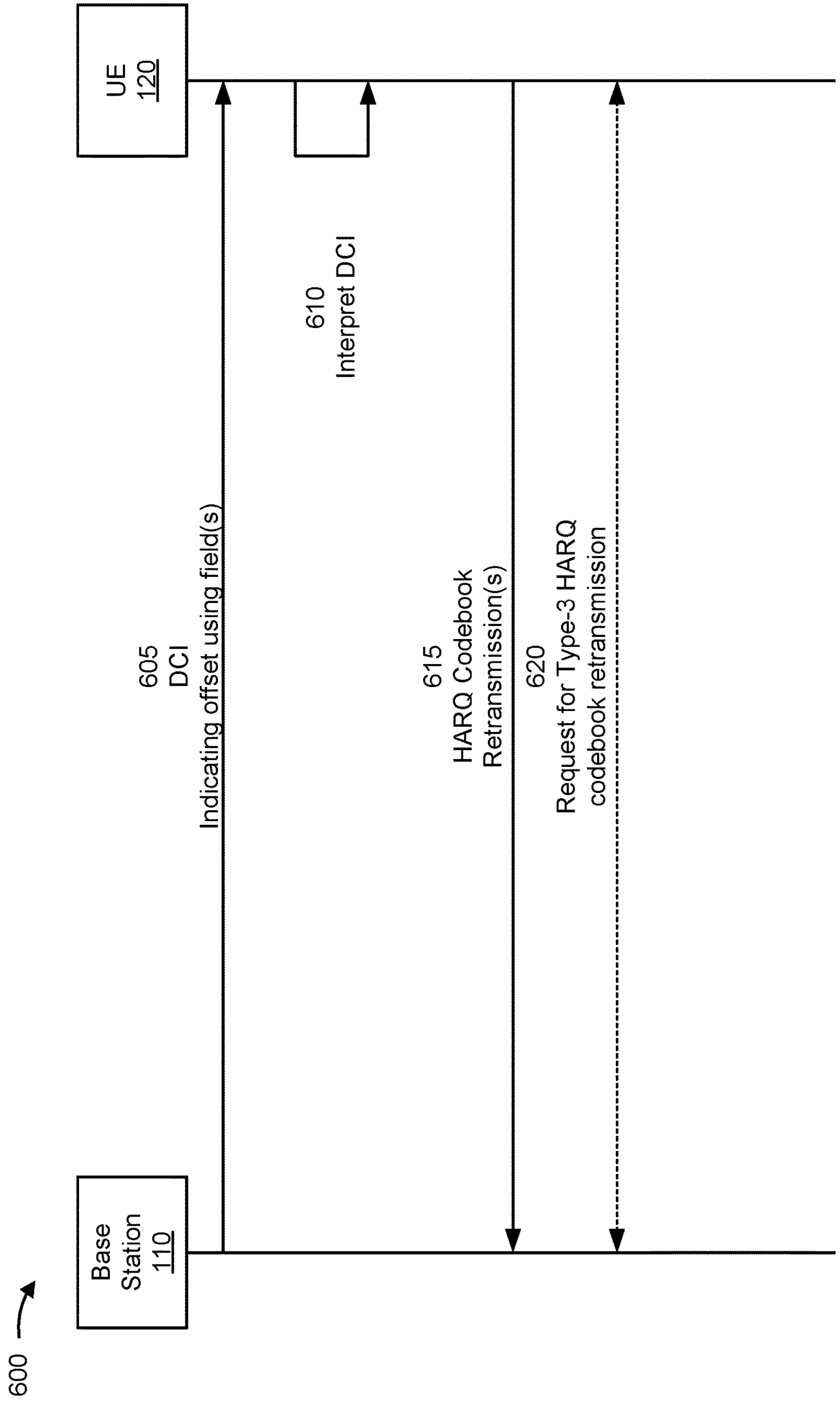
FIG. 6 is a diagram illustrating an example associated with using DCI for triggering HARQ codebook retransmission, in accordance with the present disclosure.

FIG. 6 is a diagram illustrating an example 600 associated with using DCI for triggering HARQ codebook retransmission, in accordance with the present disclosure. As shown in FIG. 6, example 600 includes communication between a network node 110 and a UE 120. In some aspects, the network node 110 and the UE 120 may be included in a wireless network, such as wireless network 100. The network node 110 and the UE 120 may communicate via a wireless access link, which may include an uplink and a downlink.

As further shown in FIG. 6, and by reference numbers 605 and 610, UE 120 may receive DCI from network node 110 and may interpret the DCI. For example, UE 120 may receive DCI associated with triggering a HARQ codebook retransmission. In some aspects, UE 120 may interpret one or more fields of the DCI to determine that the DCI is associated with triggering the HARQ codebook retransmission. For example, UE 120 may decode a HARQ ACK retransmission indicator field in the DCI, which may include a bit indicator to indicate whether HARQ codebook retransmission is triggered (e.g., a '1' may indicate that HARQ codebook retransmission is triggered and a '0' may indicate that HARQ codebook retransmission is not triggered, or any other mapping of values may be possible). In one or more examples, the DCI format 1_1 or DCI format 1_2 may be configured with a 1-bit field for conveying a HARQ retransmission indicator for one-shot triggering of HARQ retransmission. In one or more examples, the UE 120 may decode the HARQ ACK retransmission indicator field of the DCI sequentially first based on the UE 120 operating in a scenario in which HARQ codebook retransmission may occur, as described herein.

In some aspects, the UE 120 may decode and interpret one or more fields of the DCI to determine a parameter for HARQ codebook retransmission based at least in part on determining that HARQ codebook retransmission is triggered. For example, the UE 120 may interpret 5 bits of the DCI to determine an offset value for HARQ codebook retransmission (e.g., an offset value identifying a slot for which HARQ codebook retransmission is to occur). In some aspects, the UE 120 may determine the offset value based at least in part on bits of a single field of the DCI. For example, the UE 120 may interpret 5 bits from an MCS field that the network node 110 may set to indicate the offset value. In another example, the offset value may be conveyed using a different quantity of bits than 5 bits. For example, the offset value may be conveyed using fewer bits (e.g., a portion of the MCS field) or more bits (e.g., the MCS field as well as another field or portion thereof). In one or more examples, when the UE 120 interprets the 5 bits of the MCS field as the offset value, the UE 120 may determine an MCS in another manner, such as by re-using a previous MCS. In other words, the UE 120 and the network node 110 can reuse the MCS field for conveying the offset value, because the MCS field is not needed to convey an MCS indicator when the network node is triggering HARQ codebook retransmission.

Additionally, or alternatively, the UE 120 may determine the offset value based at least in part on bits of a plurality of fields of the DCI. For example, the UE 120 may interpret 5 bits from an NDI field (1 bit), an RV field (2 bits), and either an FDRA field (a sequentially first 2 bits) or an antenna port identifier field (a sequentially first 2 bits). In one or more examples, when the FDRA field has a particular value (e.g., '00' or '0000'), the UE 120 may determine that a 1-bit DCI field is not present (e.g., for using Type-3 HARQ ACK codebook or triggering one-shot HARQ retransmission). In other words, the network node 110 may set a configuration of the DCI based at least in part on determining that a configuration for Type-3 HARQ ACK codebook triggering is to be used for the UE 120, thereby enabling the UE 120 to interpret the DCI in a manner associated with Type-3 HARQ ACK codebook triggering (e.g., to reinterpret one or more fields or decode the DCI in a particular order of bits). In the example where the FDRA field has the particular value, the UE 120 may use a configured interpretation, such as interpreting an MCS as a slot offset based on the 1-bit DCI field not being present. In some aspects, the UE 120 may determine which bits and/or an order of the bits to interpret to determine the offset value based at least in part on a received configuration. For example, the network node 110 may configure the UE 120 (e.g., using radio resource control signaling) with information indicating where the network node 110 will include bits in DCI to identify an offset value. Additionally, or alternatively, the UE 120 may use a static configuration set in a specification to determine which bits and/or an order of the bits to interpret to determine the offset value.

In some aspects, the UE 120 may determine if a PDSCH is scheduled by the DCI. For example, when DCI is configured to include a HARQ codebook retransmission indicator, the UE 120 may use a behavior for Rel. 16 Type-3 HARQ codebook triggering, such that the UE 120 is configured to determine that the DCI does not schedule (i.e., includes a set of bit indicators other than one or more bit indicators to allocate resources for) a new PDSCH when the DCI triggers HARQ codebook retransmission. In one or more examples, the UE 120 may interpret the DCI fields and perform PUCCH transmission, as described herein, in accordance with the Type-3 HARQ behaviors, as described in more detail in 3GPP TS 38.213. In other examples, the UE 120 may interpret the DCI fields and perform PUCCH transmission in accordance with other behaviors, such as other types of HARQ behaviors. In some aspects, when the UE 120 decodes a field in the DCI indicating that HARD codebook retransmission is triggered, the UE 120 may forgo decoding, forgo using, or ignore, one or more other DCI fields, such as a DCI field relating to identifying a downlink transport block allocation (e.g., an FDRA field, a time domain resource allocation (TDRA) field, an MCS field, a HARQ process number field, among other examples). In some cases, when a DCI field relating to identifying a downlink transport block allocation is also usable for indicating, for example, an offset value (e.g., the FDRA) field, the UE 120 may decode the DCI field to obtain the offset value.

As further shown in FIG. 6, and by reference number 615, the UE 120 may transmit a HARQ codebook retransmission. For example, the UE 120 may retransmit HARQ codebook messages associated with a slot indicated in the DCI triggering the HARQ codebook retransmission, as described herein. In one or more examples, the UE 120 may transmit a single uplink message (e.g., a PUCCH message) or a plurality of uplink messages to convey the HARQ codebook messages.

In some aspects, the UE 120 may request a change to a codebook type, as shown in FIG. 6, and by reference number 620. For example, the UE 120 may support both triggered HARQ codebook retransmission and Type-3 HARQ codebook retransmission. In triggered HARQ codebook retransmission, the UE 120 transmits HARQ retransmissions based at least in part on receiving DCI, as described above. In contrast, in Type-3 HARQ codebook retransmission, the UE 120 is configured, by the network node 110, to monitor a reduced amount of PDCCH occasions for DCI and bundle multiple HARQ codebook retransmissions. In one or more examples, the UE 120 may receive a set of requests for HARQ codebook retransmission within a period of slots and the UE 120 may have a capability to store canceled HARQ codebook messages associated with the set of requests for HARQ codebook transmissions. As a result, the UE 120 may trigger a request for Type-3 HARQ codebook retransmission for the canceled HARQ codebook messages, which may enable the UE 120 to transmit a plurality of canceled HARQ codebook messages in a single message (e.g., as a response to a single received DCI), which may enable the UE 120 to forgo monitoring all DCI occasions (e.g., and instead monitor only a subset of DCI monitoring occasions) and forgo transmission in one or more PUCCH transmission occasions (e.g., and instead transmit in only a subset of PUCCH transmission occasions).

As indicated above, FIG. 6 is provided as an example. Other examples may differ from what is described with respect to FIG. 6.

Figure 7:
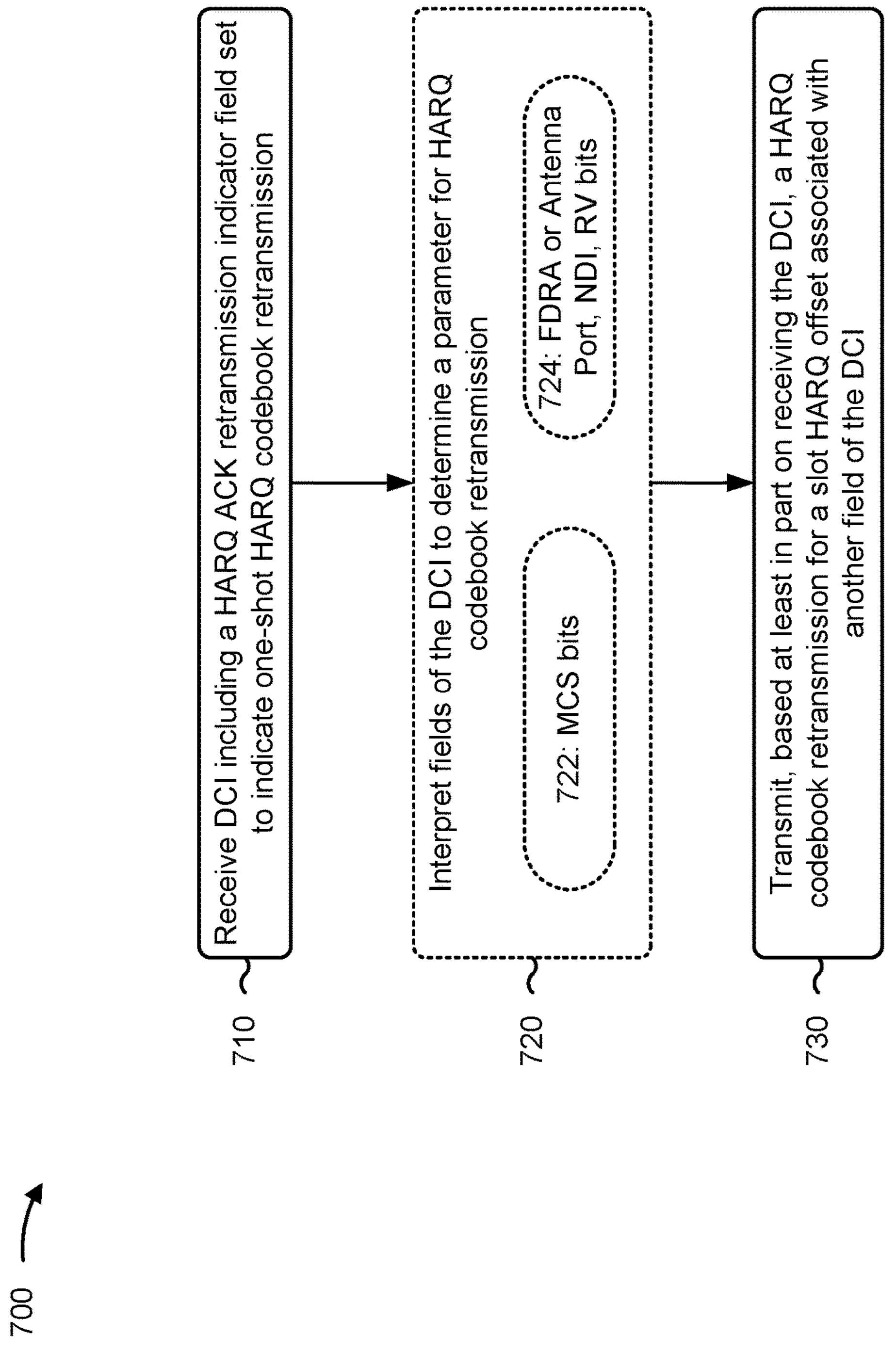
FIGS. 7-8 are diagrams illustrating example processes associated with using DCI for triggering HARQ codebook retransmission, in accordance with the present disclosure.

FIG. 7 is a diagram illustrating an example process 700 performed, for example, by a UE, in accordance with the present disclosure. Example process 700 is an example where the UE (e.g., UE 120) performs operations associated with using DCI for triggering HARQ codebook retransmission.

As shown in FIG. 7, in some aspects, process 700 may include receiving DCI including a HARQ ACK retransmission indicator field set to indicate one-shot HARQ codebook retransmission (block 710). For example, the UE (e.g., using communication manager 140 and/or reception component 902, depicted in FIG. 9) may receive DCI including a HARQ ACK retransmission indicator field set to indicate one-shot HARQ codebook retransmission, as described above.

As shown in FIG. 7, in some aspects, process 700 may include interpreting fields of the DCI to determine a parameter for HARQ codebook retransmission (block 720). For example, the UE (e.g., using communication manager 140 and/or HARQ configuration component 908, depicted in FIG. 9) may interpret fields of the DCI to determine a parameter for HARQ codebook retransmission, as described above. In some aspects, the UE may interpret MCS bits to determine the parameter for HARQ codebook retransmission (block 722). In some aspects, the UE may interpret NDI bits, RV bits, and FDRA or antenna port bits to determine the parameter for HARQ codebook retransmission (block 724).

As further shown in FIG. 7, in some aspects, process 700 may include transmitting, based at least in part on receiving the DCI, a HARQ codebook retransmission for a slot HARQ offset associated with another field of the DCI (block 730). For example, the UE (e.g., using communication manager 140 and/or transmission component 904, depicted in FIG. 9) may transmit, based at least in part on receiving the DCI, a HARQ codebook retransmission for a slot HARQ offset associated with another field of the DCI, as described above. In other words, the HARQ codebook retransmission is of HARQ transmissions associated with HARQ processes identified based at least in part on the HARQ slot offset. For example, the HARQ slot offset may indicate a particular slot for which canceled HARQ transmissions are to be retransmitted. In some aspects, the other field of the DCI may be an MCS field, a combination of an NDI field, an RV field, and an FDRA field, or a combination of an NDI field, an RV field, and an antenna port field, among other examples.

Process 700 may include additional aspects, such as any single aspect or any combination of aspects described below and/or in connection with one or more other processes described elsewhere herein.

In a first aspect, the other field of the DCI includes an MCS field.

In a second aspect, alone or in combination with the first aspect, the MCS field is a 5 bit field.

In a third aspect, alone or in combination with one or more of the first and second aspects, the other field of the DCI includes a plurality of fields, wherein the plurality of fields includes an NDI field, an RV field, and a portion of a frequency domain resource allocation field or of an antenna port field.

In a fourth aspect, alone or in combination with one or more of the first through third aspects, the plurality of fields has a size of 5 bits.

In a fifth aspect, alone or in combination with one or more of the first through fourth aspects, a PDSCH is not scheduled in connection with the DCI.

In a sixth aspect, alone or in combination with one or more of the first through fifth aspects, process 700 includes determining that the PDSCH is not scheduled based at least in part on a HARQ ACK codebook configuration associated with a set of fields of the DCI.

In a seventh aspect, alone or in combination with one or more of the first through sixth aspects, the PDSCH is scheduled based at least in part on a content of the DCI.

In an eighth aspect, alone or in combination with one or more of the first through seventh aspects, process 700 includes processing at least one of a physical uplink control channel resource field, a timing field, an antenna port field, or a combination thereof of the DCI based at least in part on a configuration for Type-3 HARQ codebook triggering.

In a ninth aspect, alone or in combination with one or more of the first through eighth aspects, process 700 includes transmitting a physical uplink control channel based at least in part on the configuration for Type-3 HARQ codebook triggering and in accordance with the set of fields of the DCI.

In a tenth aspect, alone or in combination with one or more of the first through ninth aspects, the UE is operating in a triggered HARQ codebook retransmission mode.

In an eleventh aspect, alone or in combination with one or more of the first through tenth aspects, process 700 includes receiving a set of requests for HARQ codebook retransmission during a period of one or more slots, the UE storing one or more canceled HARQ codebook requests, and triggering a request for Type-3 HARQ codebook retransmission.

In a twelfth aspect, alone or in combination with one or more of the first through eleventh aspects, triggering the request for Type-3 HARQ codebook retransmission comprises transmitting the request for Type-3 HARQ codebook retransmission, and transmitting a consolidated response to the one or more canceled HARQ codebook requests based at least in part on transmitting the request for Type-3 HARQ codebook retransmission.

In a thirteenth aspect, alone or in combination with one or more of the first through twelfth aspects, transmitting the consolidated response comprises transmitting the consolidated response based at least in part on a received DCI.

In a fourteenth aspect, alone or in combination with one or more of the first through thirteenth aspects, the received DCI is associated with a first monitoring occasion, and process 700 includes forgoing monitoring for the DCI in one or more second monitoring occasions.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
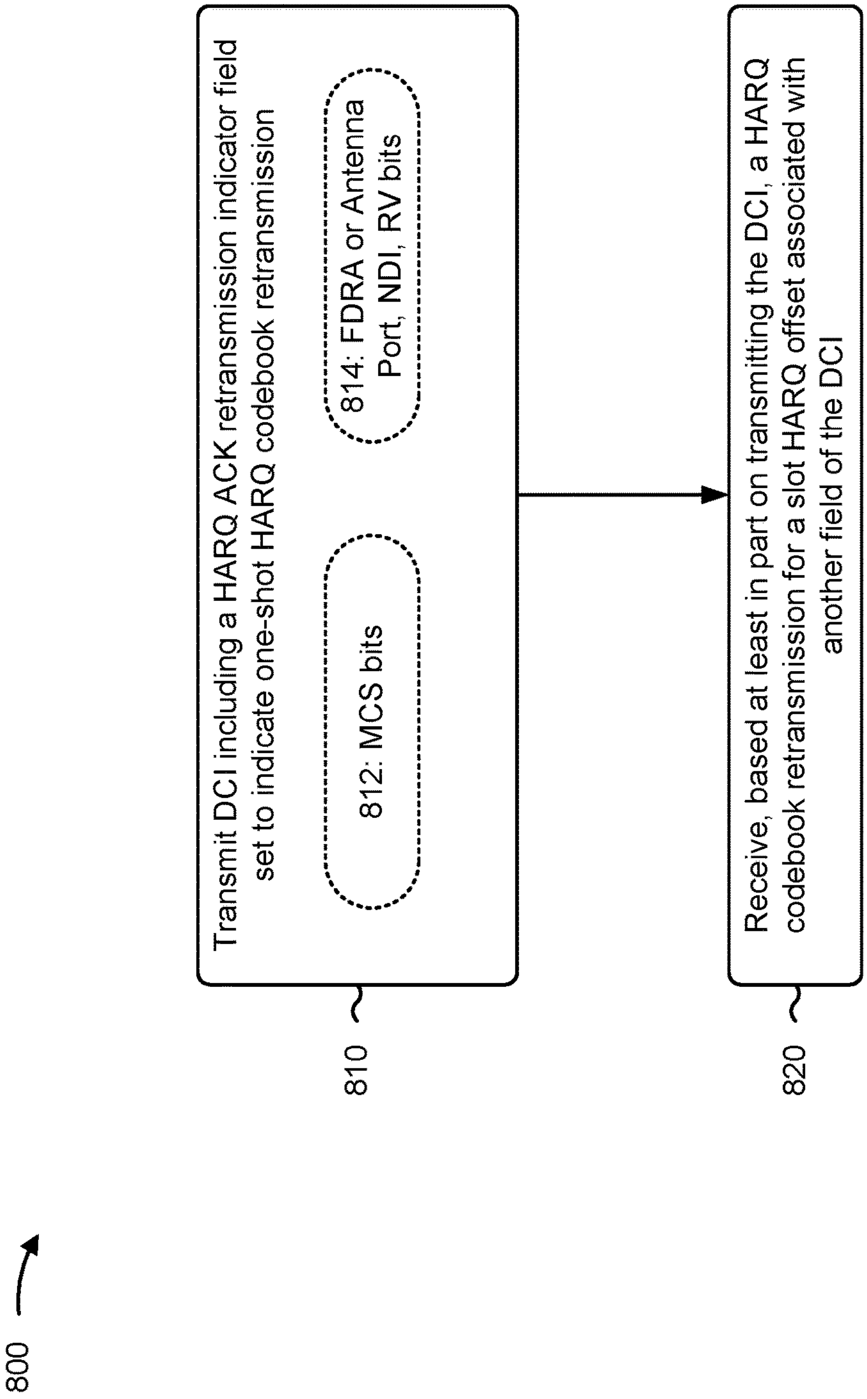

FIG. 8 is a diagram illustrating an example process 800 performed, for example, by a network node, in accordance with the present disclosure. Example process 800 is an example where the network node (e.g., network node 110) performs operations associated with using DCI to trigger HARQ codebook retransmission.

As shown in FIG. 8, in some aspects, process 800 may include transmitting DCI including a HARQ ACK retransmission indicator field set to indicate one-shot HARQ codebook retransmission (block 810). For example, the network node (e.g., using communication manager 150 and/or transmission component 1204, depicted in FIG. 12) may transmit DCI including a HARQ ACK retransmission indicator field set to indicate one-shot HARQ codebook retransmission, as described above. In some aspects, the network node may set MCS bits in the DCI to enable a UE to determine the parameter for HARQ codebook retransmission (block 812). In some aspects, the network node may set NDI bits, RV bits, and FDRA or antenna port bits in the DCI to enable a UE to determine the parameter for HARQ codebook retransmission (block 814).

As further shown in FIG. 8, in some aspects, process 800 may include receiving, based at least in part on transmitting the DCI, a HARQ codebook retransmission for a slot HARQ offset associated with another field of the DCI (block 820). For example, the network node (e.g., using communication manager 150 and/or reception component 1202, depicted in FIG. 12) may receive, based at least in part on transmitting the DCI, a HARQ codebook retransmission for a slot HARQ offset associated with another field of the DCI, as described above.

Process 800 may include additional aspects, such as any single aspect or any combination of aspects described below and/or in connection with one or more other processes described elsewhere herein.

In a first aspect, the other field of the DCI includes an MCS field.

In a second aspect, alone or in combination with the first aspect, the MCS field is a 5 bit field.

In a third aspect, alone or in combination with one or more of the first and second aspects, the other field of the DCI includes a plurality of fields, wherein the plurality of fields includes an NDI field, an RV field, and a portion of a frequency domain resource allocation field or of an antenna port field.

In a fourth aspect, alone or in combination with one or more of the first through third aspects, the plurality of fields has a size of 5 bits.

In a fifth aspect, alone or in combination with one or more of the first through fourth aspects, a PDSCH is not scheduled in connection with the DCI.

In a sixth aspect, alone or in combination with one or more of the first through fifth aspects, process 800 includes forgoing scheduling of the PDSCH in DCI based at least in part on a HARQ ACK codebook configuration associated with a set of fields of the DCI.

In a seventh aspect, alone or in combination with one or more of the first through sixth aspects, process 800 includes setting at least one of a physical uplink control channel resource field, a timing field, an antenna port field, or a combination thereof of the DCI based at least in part on a configuration for Type-3 HARQ codebook triggering.

In an eighth aspect, alone or in combination with one or more of the first through seventh aspects, process 800 includes receiving a physical uplink control channel based at least in part on the configuration for Type-3 HARQ codebook triggering and in accordance with the set of fields of the DCI.

In a ninth aspect, alone or in combination with one or more of the first through eighth aspects, the network node is communicating with a UE in a triggered HARQ codebook retransmission mode.

In a tenth aspect, alone or in combination with one or more of the first through ninth aspects, process 800 includes transmitting a set of requests for HARQ codebook retransmission during a period of one or more slots, one or more canceled HARQ codebook requests being stored at a user equipment, and receiving, from the UE, a request for Type-3 HARQ codebook retransmission.

In an eleventh aspect, alone or in combination with one or more of the first through tenth aspects, receiving the request for Type-3 HARQ codebook retransmission comprises receiving the request for Type-3 HARQ codebook retransmission, and receiving a consolidated response to the one or more canceled HARQ codebook requests based at least in part on transmitting the request for Type-3 HARQ codebook retransmission.

In a twelfth aspect, alone or in combination with one or more of the first through eleventh aspects, receiving the consolidated response comprises receiving the consolidated response based at least in part on a transmitted DCI.

In a thirteenth aspect, alone or in combination with one or more of the first through twelfth aspects, the transmitted DCI is associated with a first monitoring occasion, and process 800 includes forgoing transmission of the DCI in one or more second monitoring occasions.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
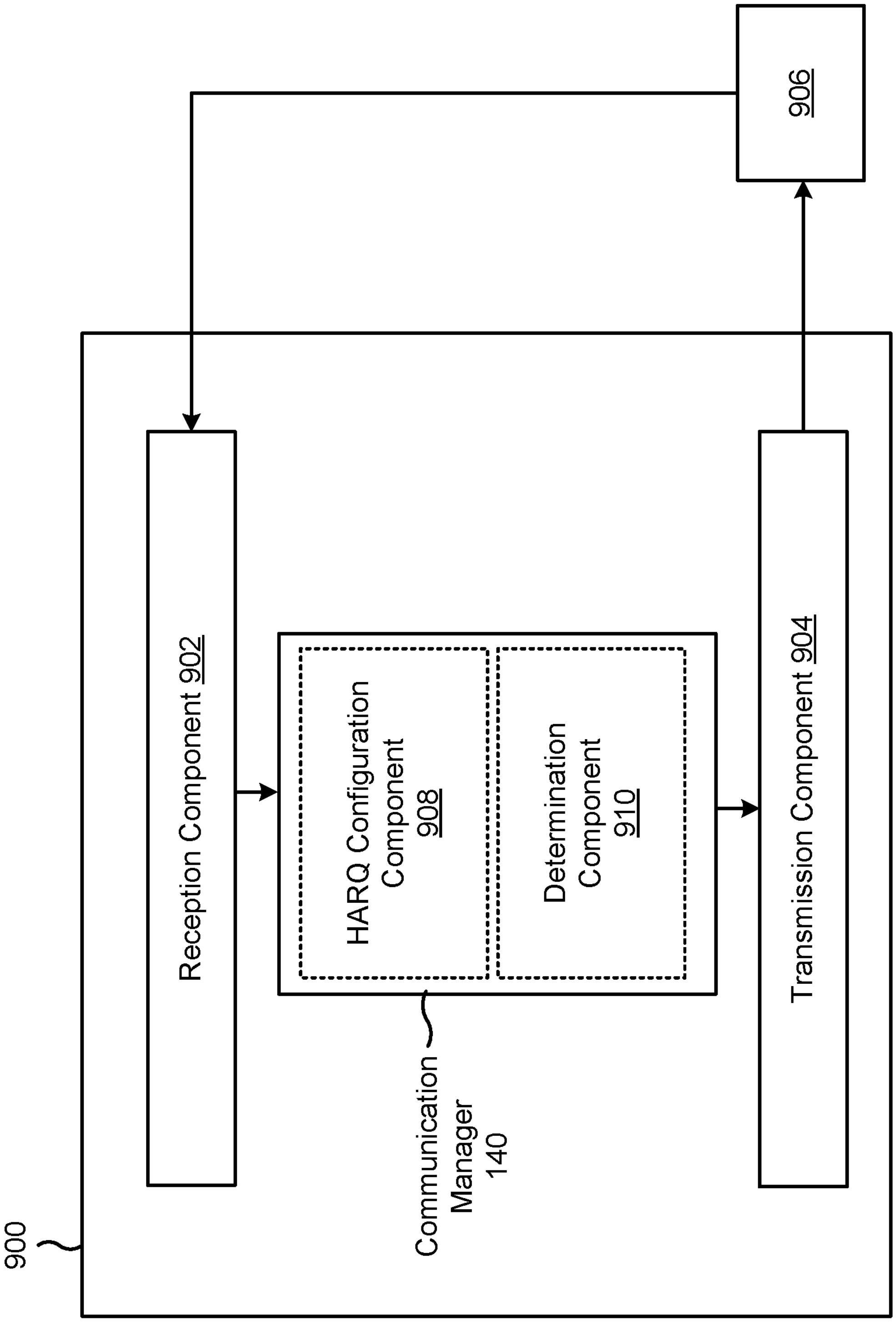
FIG. 9 is a diagram of an example apparatus for wireless communication, in accordance with the present disclosure.

FIG. 9 is a diagram of an example apparatus 900 for wireless communication. The apparatus 900 may be a UE, or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a network node, or another wireless communication device) using the reception component 902 and the transmission component 904. As further shown, the apparatus 900 may include the communication manager 140. The communication manager 140 may include one or more of a HARQ configuration component 908 or a determination component 910, among other examples.

In some aspects, the apparatus 900 may be configured to perform one or more operations described herein in connection with FIG. 6. Additionally, or alternatively, the apparatus 900 may be configured to perform one or more processes described herein, such as process 700 of FIG. 7 or process 1600 of FIG. 16, among other examples. In some aspects, the apparatus 900 and/or one or more components shown in FIG. 9 may include one or more components of the UE described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the UE described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the UE described in connection with FIG. 2. In some aspects, the transmission component 904 may be co-located with the reception component 902 in a transceiver.

The reception component 902 may receive DCI including a HARQ ACK retransmission indicator field set to indicate one-shot HARQ codebook retransmission. The transmission component 904 may transmit, based at least in part on receiving the DCI, a HARQ codebook retransmission for a slot HARQ offset associated with another field of the DCI or an MCS field of the DCI. For example, the transmission component 904 may identify a value of a 5 bit MCS field as a value for the slot HARQ offset.

The HARQ configuration component 908 may process at least one of: a physical uplink control channel resource field, a timing field, an antenna port field, or a combination thereof of the DCI based at least in part on a configuration for Type-3 HARQ codebook triggering. The determination component 910 may determine that the PDSCH is not scheduled based at least in part on a HARQ ACK codebook configuration associated with a set of fields of the DCI. The transmission component 904 may transmit a physical uplink control channel based at least in part on the configuration for Type-3 HARQ codebook triggering and in accordance with the set of fields of the DCI. The reception component 902 may receive a set of requests for HARQ codebook retransmission during a period of one or more slots, the UE storing one or more canceled HARQ codebook requests. The HARQ configuration component 908 may trigger a request for Type-3 HARQ codebook retransmission.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
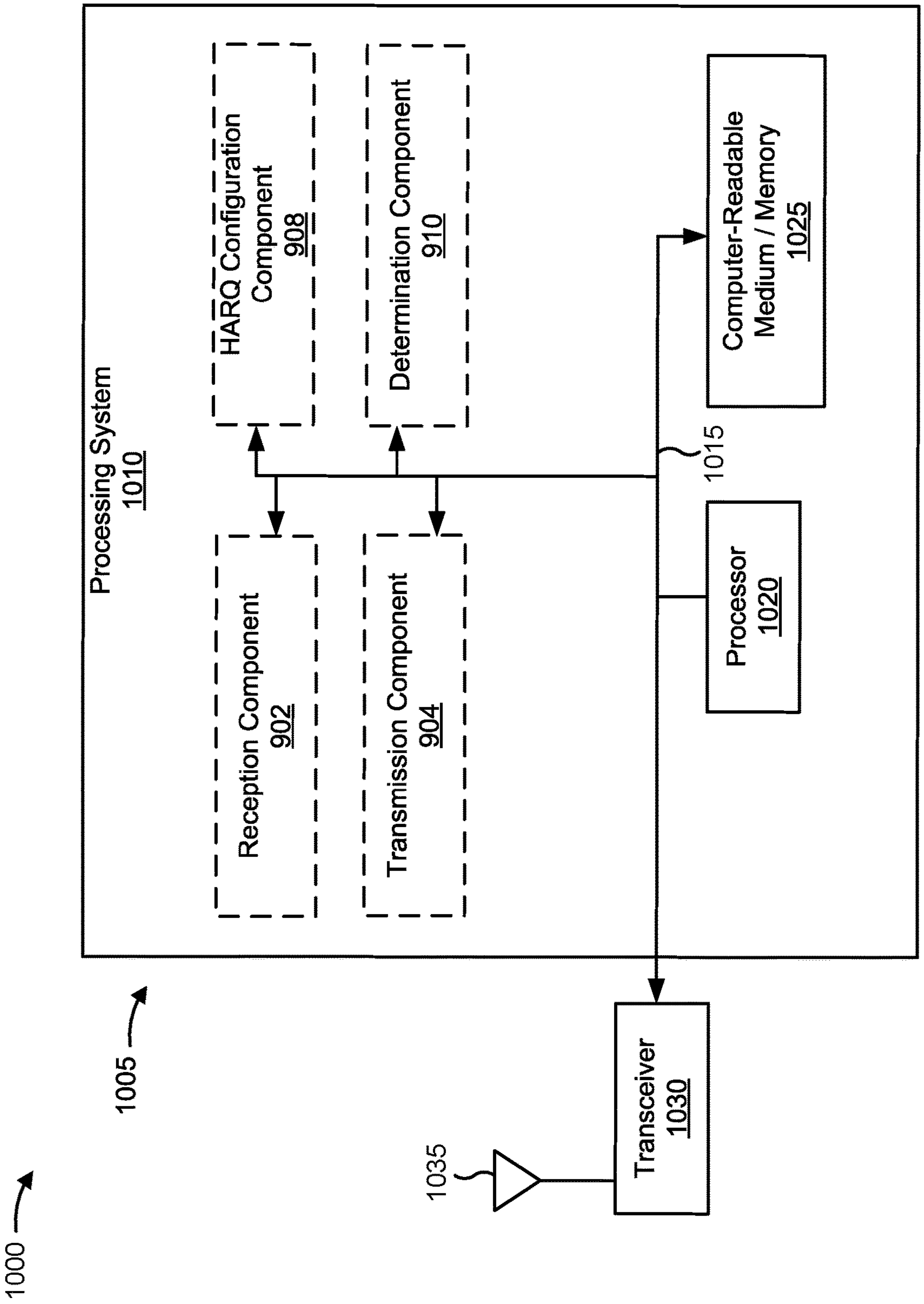
FIG. 10 is a diagram illustrating an example of a hardware implementation for an apparatus employing a processing system, in accordance with the present disclosure.

FIG. 10 is a diagram illustrating an example 1000 of a hardware implementation for an apparatus 1005 employing a processing system 1010. The apparatus 1005 may be a UE.

The processing system 1010 may be implemented with a bus architecture, represented generally by the bus 1015. The bus 1015 may include any number of interconnecting buses and bridges depending on the specific application of the processing system 1010 and the overall design constraints. The bus 1015 links together various circuits including one or more processors and/or hardware components, represented by the processor 1020, the illustrated components, and the computer-readable medium/memory 1025. The bus 1015 may also link various other circuits, such as timing sources, peripherals, voltage regulators, and/or power management circuits.

The processing system 1010 may be coupled to a transceiver 1030. The transceiver 1030 is coupled to one or more antennas 1035. The transceiver 1030 provides a means for communicating with various other apparatuses over a transmission medium. The transceiver 1030 receives a signal from the one or more antennas 1035, extracts information from the received signal, and provides the extracted information to the processing system 1010, specifically the reception component 902. In addition, the transceiver 1030 receives information from the processing system 1010, specifically the transmission component 904, and generates a signal to be applied to the one or more antennas 1035 based at least in part on the received information.

The processing system 1010 includes a processor 1020 coupled to a computer-readable medium/memory 1025. The processor 1020 is responsible for general processing, including the execution of software stored on the computer-readable medium/memory 1025. The software, when executed by the processor 1020, causes the processing system 1010 to perform the various functions described herein for any particular apparatus. The computer-readable medium/memory 1025 may also be used for storing data that is manipulated by the processor 1020 when executing software. The processing system further includes at least one of the illustrated components. The components may be software modules running in the processor 1020, resident/stored in the computer readable medium/memory 1025, one or more hardware modules coupled to the processor 1020, or some combination thereof.

In some aspects, the processing system 1010 may be a component of the UE 120 and may include the memory 282 and/or at least one of the TX MIMO processor 266, the receive (RX) processor 258, and/or the controller/processor 280. In some aspects, the apparatus 1005 for wireless communication includes means for receiving DCI including a HARQ ACK retransmission indicator field set to indicate one-shot HARQ codebook retransmission; and means for transmitting, based at least in part on receiving the DCI, a HARQ codebook retransmission for a slot HARQ offset associated with another field of the DCI or an MCS field of the DCI. Additionally, or alternatively, the apparatus 1005 includes means for determining that the PDSCH is not scheduled based at least in part on a HARQ ACK codebook configuration associated with a set of fields of the DCI; means for processing at least one of: a physical uplink control channel resource field, a timing field, an antenna port field, or a combination thereof of the DCI based at least in part on a configuration for Type-3 HARQ codebook triggering; and means for transmitting a physical uplink control channel based at least in part on the configuration for Type-3 HARQ codebook triggering and in accordance with the set of fields of the DCI. Additionally, or alternatively, the apparatus 1005 includes means for receiving a set of requests for HARQ codebook retransmission during a period of one or more slots, the UE storing one or more canceled HARQ codebook requests; means for triggering a request for Type-3 HARQ codebook retransmission; and means for transmitting the request for Type-3 HARQ codebook retransmission. Additionally, or alternatively, the apparatus 1005 includes means for transmitting a consolidated response to the one or more canceled HARQ codebook requests based at least in part on transmitting the request for Type-3 HARQ codebook retransmission; means for transmitting the consolidated response based at least in part on a received DCI; and means for forgoing monitoring for the DCI in one or more second monitoring occasions. The aforementioned means may be one or more of the aforementioned components of the apparatus 900 and/or the processing system 1010 of the apparatus 1005 configured to perform the functions recited by the aforementioned means. As described elsewhere herein, the processing system 1010 may include the TX MIMO processor 266, the RX processor 258, and/or the controller/processor 280. In one configuration, the aforementioned means may be the TX MIMO processor 266, the RX processor 258, and/or the controller/processor 280 configured to perform the functions and/or operations recited herein.

FIG. 10 is provided as an example. Other examples may differ from what is described in connection with FIG. 10.

Figure 11:
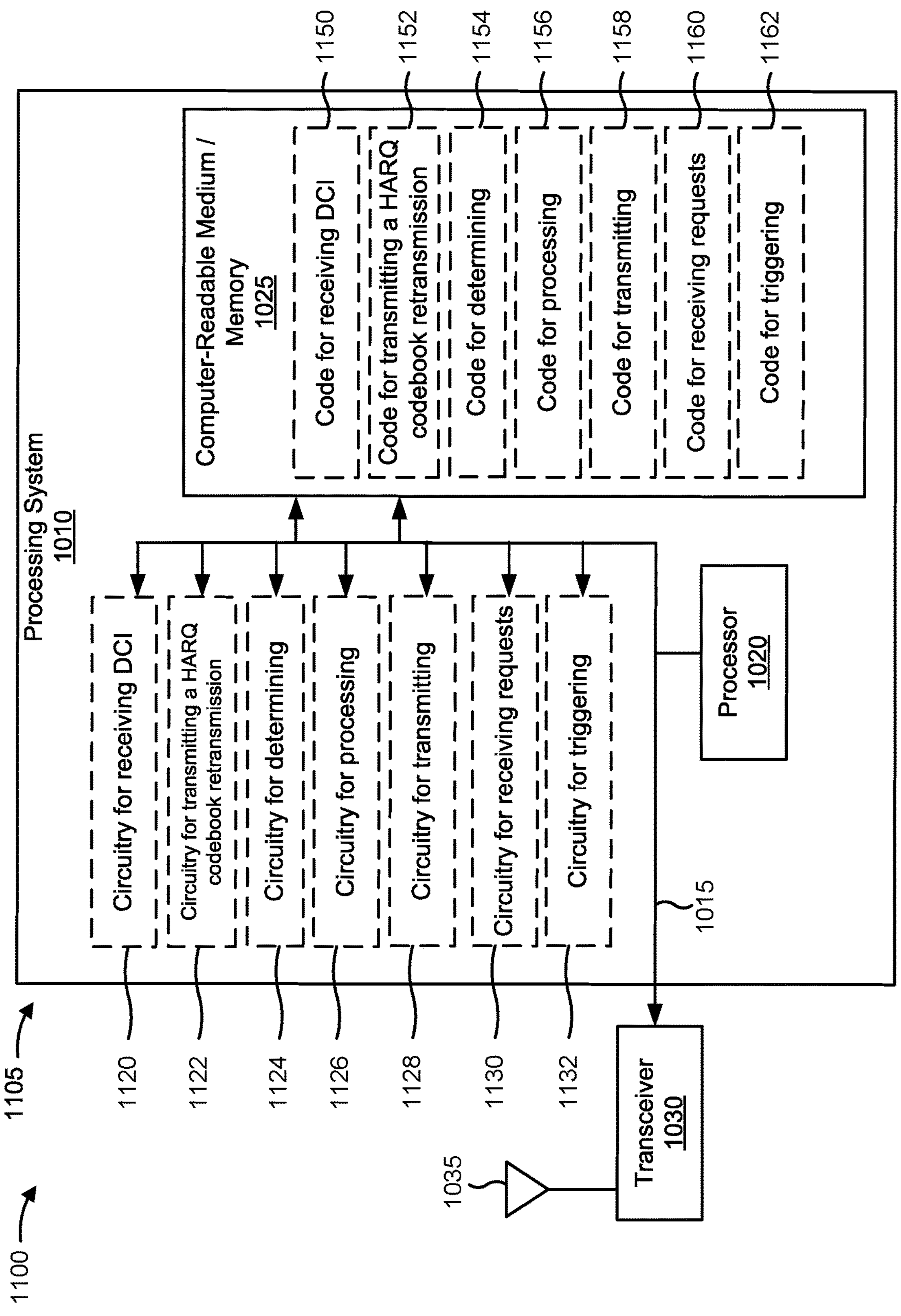
FIG. 11 is a diagram illustrating an example implementation of code and circuitry for an apparatus, in accordance with the present disclosure.

FIG. 11 is a diagram illustrating an example 1100 of an implementation of code and circuitry for an apparatus 1105, in accordance with the present disclosure. The apparatus 1105 may be a UE.

As shown in FIG. 11, the apparatus 1105 may include circuitry for receiving DCI (circuitry 1120). For example, the circuitry 1120 may provide means for receiving DCI including a HARQ ACK retransmission indicator field set to indicate one-shot HARQ codebook retransmission. In some aspects, the circuitry 1120 may provide means for receiving DCI in a first monitoring occasion and means for forgoing monitoring for the DCI in one or more second monitoring occasions.

As shown in FIG. 11, the apparatus 1105 may include circuitry for transmitting a HARQ codebook retransmission (circuitry 1122). For example, the circuitry 1122 may provide means for transmitting, based at least in part on receiving the DCI, a HARQ codebook retransmission for a slot HARQ offset associated with another field of the DCI or an MCS field of the DCI.

As shown in FIG. 11, the apparatus 1105 may include circuitry for determining (circuitry 1124). For example, the circuitry 1124 may provide means for determining that the PDSCH is not scheduled based at least in part on a HARQ ACK codebook configuration associated with a set of fields of the DCI.

As shown in FIG. 11, the apparatus 1105 may include circuitry for processing (circuitry 1126). For example, the circuitry 1126 may provide means for processing at least one of: a physical uplink control channel resource field, a timing field, an antenna port field, or a combination thereof of the DCI based at least in part on a configuration for Type-3 HARQ codebook triggering.

As shown in FIG. 11, the apparatus 1105 may include circuitry for transmitting (circuitry 1128). For example, the circuitry 1128 may provide means for transmitting a physical uplink control channel based at least in part on the configuration for Type-3 HARQ codebook triggering and in accordance with the set of fields of the DCI; means for transmitting the request for Type-3 HARQ codebook retransmission; means for transmitting a consolidated response to the one or more canceled HARQ codebook requests based at least in part on transmitting the request for Type-3 HARQ codebook retransmission; and means for transmitting the consolidated response based at least in part on a received DCI.

As shown in FIG. 11, the apparatus 1105 may include circuitry for receiving requests (circuitry 1130). For example, the circuitry 1130 may provide means for receiving a set of requests for HARQ codebook retransmission during a period of one or more slots, the UE storing one or more canceled HARQ codebook requests.

As shown in FIG. 11, the apparatus 1105 may include circuitry for triggering (circuitry 1132). For example, the circuitry 1132 may provide means for triggering a request for Type-3 HARQ codebook retransmission.

The circuitry 1120, 1122, 1124, 1126, 1128, 1130, and/or 1132 may include one or more components of the UE described above in connection with FIG. 2, such as transmit processor 264, transmit MIMO processor 266, modem 254, MIMO detector 256, receive processor 258, antenna 252, controller/processor 280, and/or memory 282.

As shown in FIG. 11, the apparatus 1105 may include, stored in computer-readable medium 1025, code for receiving DCI (code 1150). For example, the code 1150, when executed by the processor 1020, may cause the apparatus 1105 to receive DCI including a HARQ ACK retransmission indicator field set to indicate one-shot HARQ codebook retransmission. In some aspects, the circuitry 1120 may provide means for receiving DCI in a first monitoring occasion and means for forgoing monitoring for the DCI in one or more second monitoring occasions.

As shown in FIG. 11, the apparatus 1105 may include, stored in computer-readable medium 1025, code for transmitting a HARQ codebook retransmission (code 1152). For example, the code 1152, when executed by the processor 1020, may cause the apparatus 1105 to transmit, based at least in part on receiving the DCI, a HARQ codebook retransmission for a slot HARQ offset associated with another field of the DCI.

As shown in FIG. 11, the apparatus 1105 may include, stored in computer-readable medium 1025, code for determination (code 1154). For example, the code 1154, when executed by the processor 1020, may cause the apparatus 1105 to determine that the PDSCH is not scheduled based at least in part on a HARQ ACK codebook configuration associated with a set of fields of the DCI.

As shown in FIG. 11, the apparatus 1105 may include, stored in computer-readable medium 1025, code for processing (code 1156). For example, the code 1156, when executed by the processor 1020, may cause the apparatus 1105 to process at least one of: a physical uplink control channel resource field, a timing field, an antenna port field, or a combination thereof of the DCI based at least in part on a configuration for Type-3 HARQ codebook triggering.

As shown in FIG. 11, the apparatus 1105 may include, stored in computer-readable medium 1025, code for transmitting (code 1158). For example, the code 1158, when executed by the processor 1020, may cause the apparatus 1105 to transmit a physical uplink control channel based at least in part on the configuration for Type-3 HARQ codebook triggering and in accordance with the set of fields of the DCI; transmit the request for Type-3 HARQ codebook retransmission; transmit a consolidated response to the one or more canceled HARQ codebook requests based at least in part on transmitting the request for Type-3 HARQ codebook retransmission; and transmit the consolidated response based at least in part on a received DCI.

As shown in FIG. 11, the apparatus 1105 may include, stored in computer-readable medium 1025, code for receiving requests (code 1160). For example, the code 1160, when executed by the processor 1020, may cause the apparatus 1105 to receive a set of requests for HARQ codebook retransmission during a period of one or more slots, the UE storing one or more canceled HARQ codebook requests.

As shown in FIG. 11, the apparatus 1105 may include, stored in computer-readable medium 1025, code for triggering (code 1162). For example, the code 1162, when executed by the processor 1020, may cause the apparatus 1105 to trigger a request for Type-3 HARQ codebook retransmission.

FIG. 11 is provided as an example. Other examples may differ from what is described in connection with FIG. 11.

Figure 12:
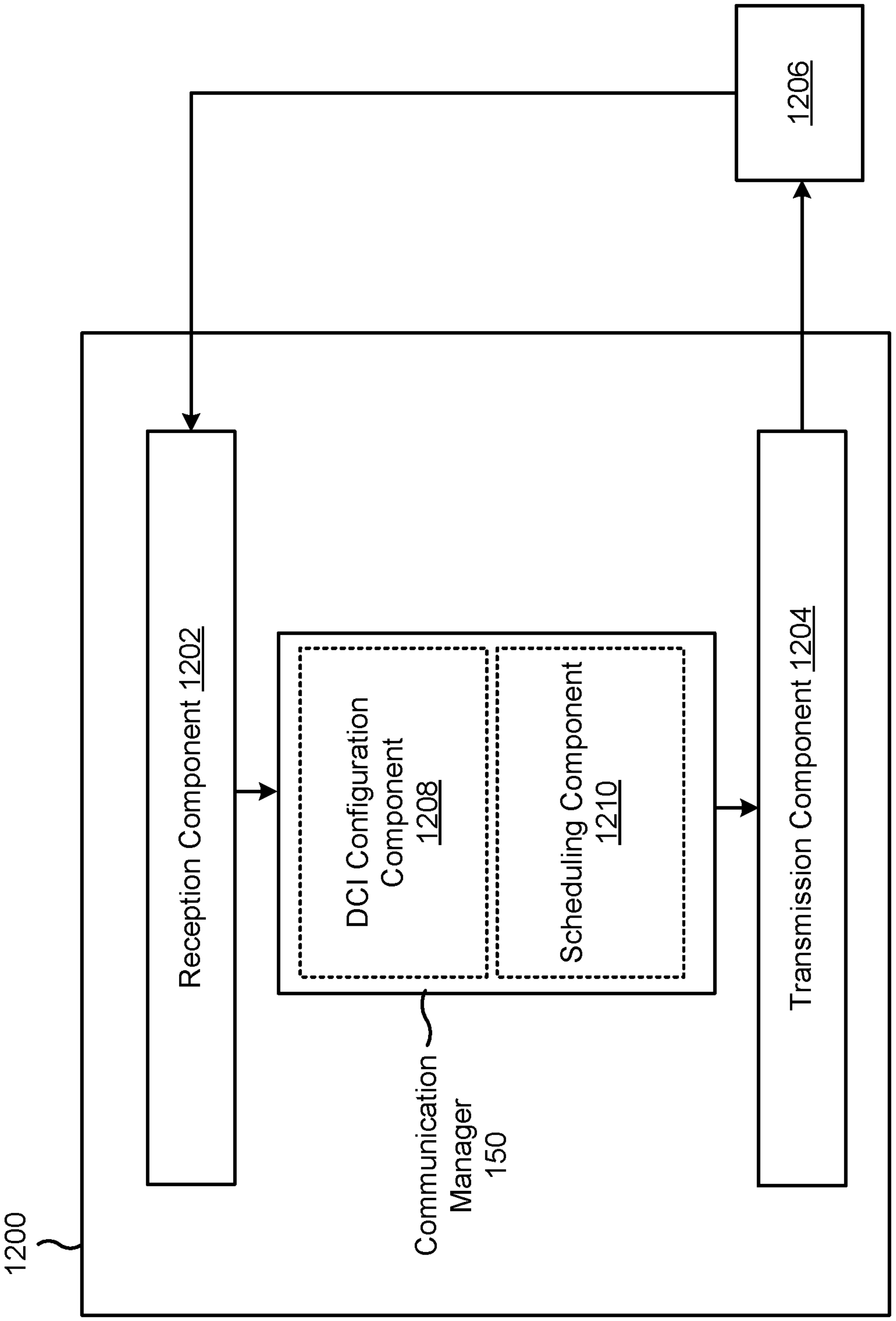
FIG. 12 is a diagram of an example apparatus for wireless communication, in accordance with the present disclosure.

FIG. 12 is a diagram of an example apparatus 1200 for wireless communication. The apparatus 1200 may be a network node, or a network node may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a network node, or another wireless communication device) using the reception component 1202 and the transmission component 1204. As further shown, the apparatus 1200 may include the communication manager 150. The communication manager 150 may include one or more of a DCI configuration component 1208 or a scheduling component 1210, among other examples.

In some aspects, the apparatus 1200 may be configured to perform one or more operations described herein in connection with FIG. 6. Additionally, or alternatively, the apparatus 1200 may be configured to perform one or more processes described herein, such as process 800 of FIG. 8 or process 1700 of FIG. 17, among other examples. In some aspects, the apparatus 1200 and/or one or more components shown in FIG. 12 may include one or more components of the network node described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, a modem, a demodulator, a MIMO detector, a receive processor, a controller/processor, a memory, or a combination thereof, of the network node described in connection with FIG. 2.

The transmission component 1204 may transmit communications, such as reference signals, control information, data communications, or a combination thereof, to the apparatus 1206. In some aspects, one or more other components of the apparatus 1200 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modem, a modulator, a transmit MIMO processor, a transmit processor, a controller/processor, a memory, or a combination thereof, of the network node described in connection with FIG. 2. In some aspects, the transmission component 1204 may be co-located with the reception component 1202 in a transceiver.

The transmission component 1204 may transmit DCI including a HARQ ACK retransmission indicator field set to indicate one-shot HARQ codebook retransmission. The reception component 1202 may receive, based at least in part on transmitting the DCI, a HARQ codebook retransmission for a slot HARQ offset associated with another field of the DCI.

The scheduling component 1210 may forgo scheduling of the PDSCH in DCI based at least in part on a HARQ ACK codebook configuration associated with a set of fields of the DCI. The DCI configuration component 1208 may set at least one of: a physical uplink control channel resource field, a timing field, an antenna port field, or a combination thereof of the DCI based at least in part on a configuration for Type-3 HARQ codebook triggering. The reception component 1202 may receive a physical uplink control channel based at least in part on the configuration for Type-3 HARQ codebook triggering and in accordance with the set of fields of the DCI.

The transmission component 1204 may transmit a set of requests for HARQ codebook retransmission during a period of one or more slots, one or more canceled HARQ codebook requests being stored at a UE. The reception component 1202 may receive, from the UE, a request for Type-3 HARQ codebook retransmission.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

Figure 13:
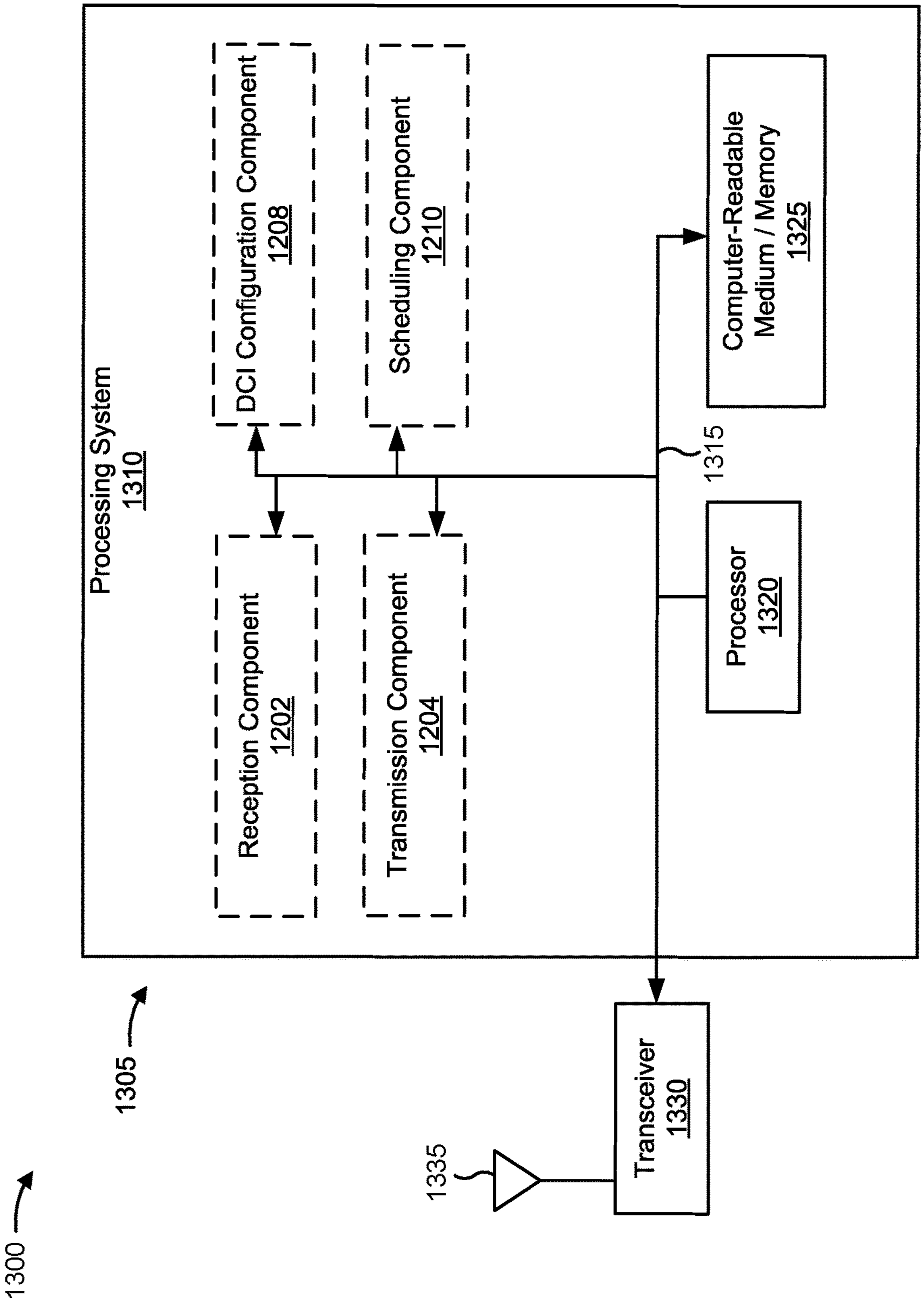
FIG. 13 is a diagram illustrating an example of a hardware implementation for an apparatus employing a processing system, in accordance with the present disclosure.

FIG. 13 is a diagram illustrating an example 1300 of a hardware implementation for an apparatus 1305 employing a processing system 1310. The apparatus 1305 may be a network node.

The processing system 1310 may be implemented with a bus architecture, represented generally by the bus 1315. The bus 1315 may include any number of interconnecting buses and bridges depending on the specific application of the processing system 1310 and the overall design constraints. The bus 1315 links together various circuits including one or more processors and/or hardware components, represented by the processor 1320, the illustrated components, and the computer-readable medium/memory 1325. The bus 1315 may also link various other circuits, such as timing sources, peripherals, voltage regulators, and/or power management circuits.

The processing system 1310 may be coupled to a transceiver 1330. The transceiver 1330 is coupled to one or more antennas 1335. The transceiver 1330 provides a means for communicating with various other apparatuses over a transmission medium. The transceiver 1330 receives a signal from the one or more antennas 1335, extracts information from the received signal, and provides the extracted information to the processing system 1310, specifically the reception component 1202. In addition, the transceiver 1330 receives information from the processing system 1310, specifically the transmission component 1204, and generates a signal to be applied to the one or more antennas 1335 based at least in part on the received information.

The processing system 1310 includes a processor 1320 coupled to a computer-readable medium/memory 1325. The processor 1320 is responsible for general processing, including the execution of software stored on the computer-readable medium/memory 1325. The software, when executed by the processor 1320, causes the processing system 1310 to perform the various functions described herein for any particular apparatus. The computer-readable medium/memory 1325 may also be used for storing data that is manipulated by the processor 1320 when executing software. The processing system further includes at least one of the illustrated components. The components may be software modules running in the processor 1320, resident/stored in the computer readable medium/memory 1325, one or more hardware modules coupled to the processor 1320, or some combination thereof.

In some aspects, the processing system 1310 may be a component of the network node 110 and may include the memory 242 and/or at least one of the TX MIMO processor 230, the RX processor 238, and/or the controller/processor 240. In some aspects, the apparatus 1305 for wireless communication includes means for transmitting DCI including a HARQ ACK retransmission indicator field set to indicate one-shot HARQ codebook retransmission; and/or means for receiving, based at least in part on transmitting the DCI, a HARQ codebook retransmission for a slot HARQ offset associated with another field of the DCI or an MCS field of the DCI. In some aspects, the apparatus 1305 includes means for forgoing scheduling of the PDSCH in DCI based at least in part on a HARQ ACK codebook configuration associated with a set of fields of the DCI; means for setting at least one of: a physical uplink control channel resource field, a timing field, an antenna port field, or a combination thereof of the DCI based at least in part on a configuration for Type-3 HARQ codebook triggering; and/or means for receiving a physical uplink control channel based at least in part on the configuration for Type-3 HARQ codebook triggering and in accordance with the set of fields of the DCI. In some aspects, the apparatus 1305 includes means for transmitting a set of requests for HARQ codebook retransmission during a period of one or more slots, one or more canceled HARQ codebook requests being stored at a user equipment; means for receiving, from the user equipment, a request for Type-3 HARQ codebook retransmission; means for receiving the request for Type-3 HARQ codebook retransmission; means for receiving a consolidated response to the one or more canceled HARQ codebook requests based at least in part on transmitting the request for Type-3 HARQ codebook retransmission; means for receiving the consolidated response based at least in part on a transmitted DCI; and/or means for forgoing transmission of the DCI in one or more second monitoring occasions.

The aforementioned means may be one or more of the aforementioned components of the apparatus 1200 and/or the processing system 1310 of the apparatus 1305 configured to perform the functions recited by the aforementioned means. As described elsewhere herein, the processing system 1310 may include the TX MIMO processor 230, the RX processor 238, and/or the controller/processor 240. In one configuration, the aforementioned means may be the TX MIMO processor 230, the RX processor 238, and/or the controller/processor 240 configured to perform the functions and/or operations recited herein.

FIG. 13 is provided as an example. Other examples may differ from what is described in connection with FIG. 13.

Figure 14:
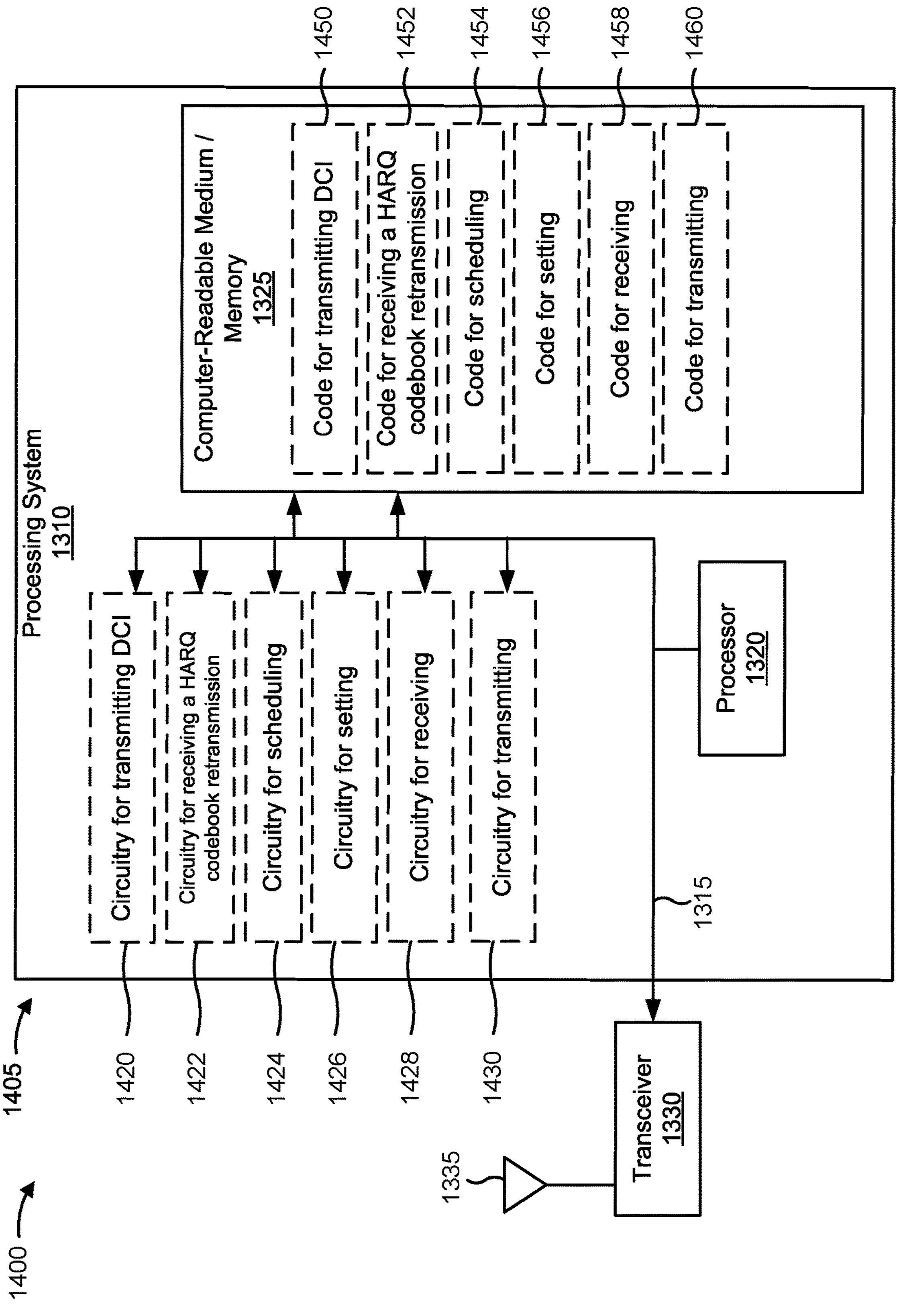
FIG. 14 is a diagram illustrating an example implementation of code and circuitry for an apparatus, in accordance with the present disclosure.

FIG. 14 is a diagram illustrating an example 1400 of an implementation of code and circuitry for an apparatus 1405, in accordance with the present disclosure. The apparatus 1405 may be a UE.

As shown in FIG. 14, the apparatus 1405 may include circuitry for transmitting DCI (circuitry 1420). For example, the circuitry 1420 may provide means for transmitting DCI including a HARQ ACK retransmission indicator field set to indicate one-shot HARQ codebook retransmission. In some aspects, the circuitry 1420 may provide means for transmitting DCI in a first monitoring occasion and forgoing transmission of the DCI in one or more second monitoring occasions.

As shown in FIG. 14, the apparatus 1405 may include circuitry for receiving a HARQ codebook retransmission (circuitry 1422). For example, the circuitry 1422 may provide means for receiving, based at least in part on transmitting the DCI, a HARQ codebook retransmission for a slot HARQ offset associated with another field of the DCI or an MCS field of the DCI.

As shown in FIG. 14, the apparatus 1405 may include circuitry for scheduling (circuitry 1424). For example, the circuitry 1424 may provide means for forgoing scheduling of the PDSCH in DCI based at least in part on a HARQ ACK codebook configuration associated with a set of fields of the DCI.

As shown in FIG. 14, the apparatus 1405 may include circuitry for setting (circuitry 1426). For example, the circuitry 1426 may provide means for setting at least one of: a physical uplink control channel resource field, a timing field, an antenna port field, or a combination thereof of the DCI based at least in part on a configuration for Type-3 HARQ codebook triggering.

As shown in FIG. 14, the apparatus 1405 may include circuitry for receiving (circuitry 1428). For example, the circuitry 1428 may provide means for receiving a physical uplink control channel based at least in part on the configuration for Type-3 HARQ codebook triggering and in accordance with the set of fields of the DCI; means for receiving, from a user equipment, a request for Type-3 HARQ codebook retransmission; means for receiving the request for Type-3 HARQ codebook retransmission; means for receiving a consolidated response to the one or more canceled HARQ codebook requests based at least in part on transmitting the request for Type-3 HARQ codebook retransmission; and/or means for receiving the consolidated response based at least in part on a transmitted DCI.

As shown in FIG. 14, the apparatus 1405 may include circuitry for transmitting requests (circuitry 1430). For example, the circuitry 1430 may provide means for transmitting a set of requests for HARQ codebook retransmission during a period of one or more slots, one or more canceled HARQ codebook requests being stored at a user equipment.

The circuitry 1420, 1422, 1424, 1426, 1428, and/or 1430 may include one or more components of the network node described above in connection with FIG. 2, such as transmit processor 220, transmit MIMO processor 230, modem 232, MIMO detector 236, receive processor 238, antenna 234, controller/processor 240, and/or memory 242.

As shown in FIG. 14, the apparatus 1405 may include, stored in computer-readable medium 1325, code for transmitting DCI (code 1450). For example, the code 1450, when executed by the processor 1320, may cause the apparatus 1405 to transmit DCI including a HARQ retransmission indicator field set to indicate one-shot HARQ codebook retransmission. In some aspects, the circuitry 1420 may provide means for transmitting DCI in a first monitoring occasion and means for forgoing transmission of DCI in one or more second monitoring occasions.

As shown in FIG. 14, the apparatus 1405 may include, stored in computer-readable medium 1325, code for receiving a HARQ codebook retransmission (code 1452). For example, the code 1452, when executed by the processor 1320, may cause the apparatus 1405 to receive, based at least in part on transmitting the DCI, a HARQ codebook retransmission for a slot HARQ offset associated with another field of the DCI or an MCS field of the DCI.

As shown in FIG. 14, the apparatus 1405 may include, stored in computer-readable medium 1325, code for scheduling (code 1454). For example, the code 1454, when executed by the processor 1320, may cause the apparatus 1405 to forgo scheduling of the PDSCH in DCI based at least in part on a HARQ ACK codebook configuration associated with a set of fields of the DCI.

As shown in FIG. 14, the apparatus 1405 may include, stored in computer-readable medium 1325, code for setting (code 1456). For example, the code 1456, when executed by the processor 1320, may cause the apparatus 1405 to set at least one of: a physical uplink control channel resource field, a timing field, an antenna port field, or a combination thereof of the DCI based at least in part on a configuration for Type-3 HARQ codebook triggering.

As shown in FIG. 14, the apparatus 1405 may include, stored in computer-readable medium 1325, code for receiving (code 1458). For example, the code 1458, when executed by the processor 1320, may cause the apparatus 1405 to receive a physical uplink control channel based at least in part on the configuration for Type-3 HARQ codebook triggering and in accordance with the set of fields of the DCI; receive the request for Type-3 HARQ codebook retransmission; receive a consolidated response to the one or more canceled HARQ codebook requests based at least in part on transmitting the request for Type-3 HARQ codebook retransmission; and/or receive the consolidated response based at least in part on a transmitted DCI.

As shown in FIG. 14, the apparatus 1405 may include, stored in computer-readable medium 1325, code for transmitting (code 1460). For example, the code 1460, when executed by the processor 1320, may cause the apparatus 1405 to transmit a set of requests for HARQ codebook retransmission during a period of one or more slots, one or more canceled HARQ codebook requests being stored at a UE.

FIG. 14 is provided as an example. Other examples may differ from what is described in connection with FIG. 14.

Figure 15:
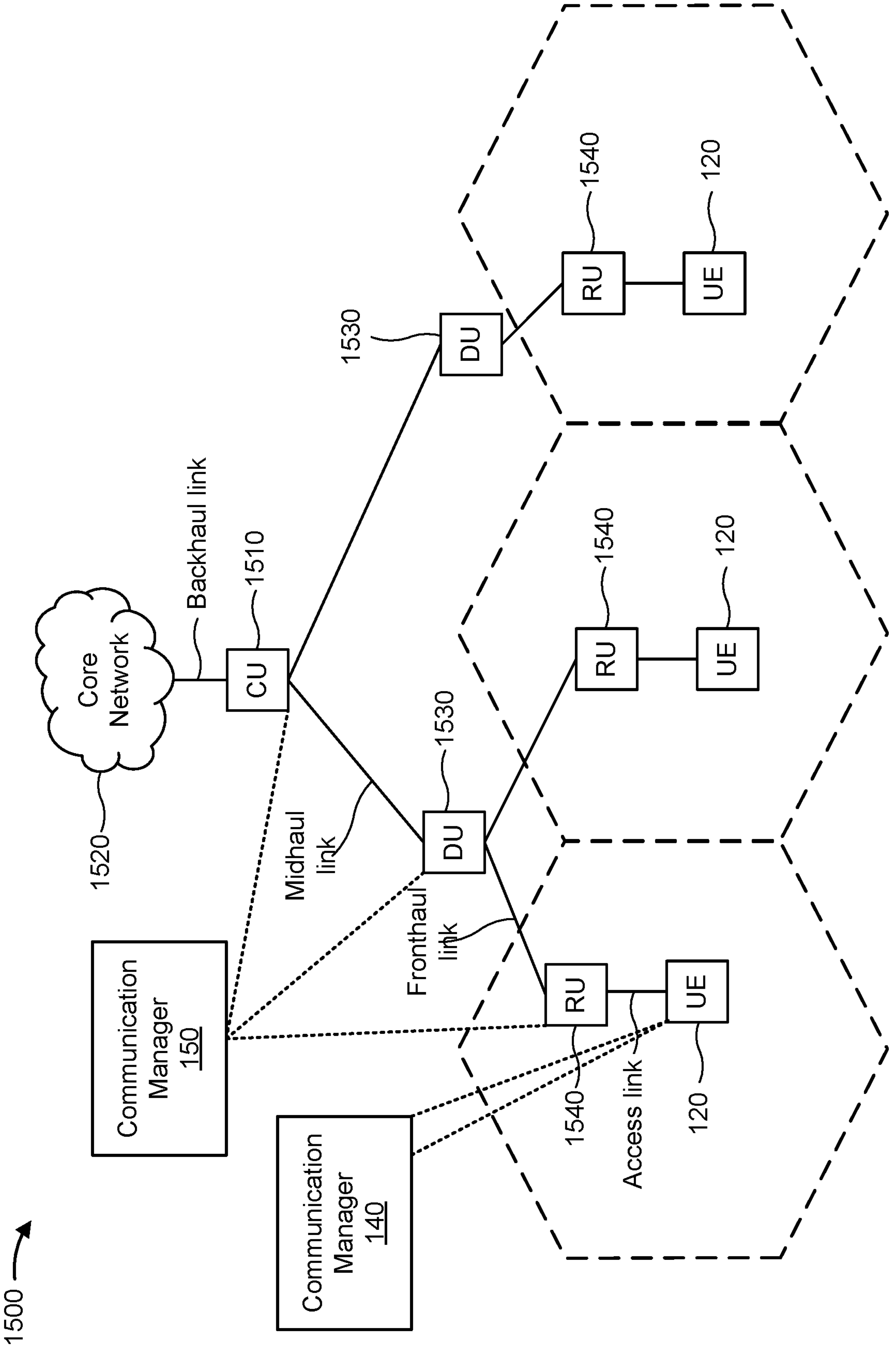
FIG. 15 is a diagram illustrating an example of an open RAN (O-RAN) architecture, in accordance with the present disclosure.

FIG. 15 is a diagram illustrating an example 1500 of an open RAN (O-RAN) architecture, in accordance with the present disclosure. As shown in FIG. 15, the O-RAN architecture may include a CU 1510 that communicates with a core network 1520 via a backhaul link. Furthermore, the CU 1510 may communicate with one or more DUs 1530 via respective midhaul links. The DUs 1530 may each communicate with one or more RUs 1540 via respective fronthaul links, and the RUs 1540 may each communicate with respective UEs 120 via radio frequency (RF) access links. The DUs 1530 and the RUs 1540 may also be referred to as O-RAN DUs (O-DUs) 1530 and O-RAN RUs (O-RUs) 1540, respectively.

In some aspects, the DUs 1530 and the RUs 1540 may be implemented according to a functional split architecture in which functionality of a network node 110 (e.g., base station, an eNB, or a gNB) is provided by a DU 1530 and one or more RUs 1540 that communicate over a fronthaul link. Accordingly, as described herein, a network node 110 may include a DU 1530 and one or more RUs 1540 that may be co-located or geographically distributed. As described above, the CU 1510 and/or the DUs 1530 may correspond to one or more network nodes 110 or portions thereof and/or any other network node or base station described herein. For example, any one or more of the CU 1510, the DU 1530, and/or the RU 1540 may host the communication manager 150 for controlling communication with, for example, the UE 120 and the communication manager 140. In some aspects, the DU 1530 and the associated RU(s) 1540 may communicate via a fronthaul link to exchange real-time control plane information via a lower layer split (LLS) control plane (LLS-C) interface, to exchange non-real-time management information via an LLS management plane (LLS-M) interface, and/or to exchange user plane information via an LLS user plane (LLS-U) interface.

Accordingly, the DU 1530 may correspond to a logical unit that includes one or more base station functions to control the operation of one or more RUs 1540. For example, in some aspects, the DU 1530 may host a radio link control (RLC) layer, a medium access control (MAC) layer, and one or more high physical (PHY) layers (e.g., forward error correction (FEC) encoding and decoding, scrambling, and/or modulation and demodulation) based at least in part on a lower layer functional split. Higher layer control functions, such as a packet data convergence protocol (PDCP), radio resource control (RRC), and/or service data adaptation protocol (SDAP), may be hosted by the CU 1510. The RU(s) 1540 controlled by a DU 1530 may correspond to logical nodes that host RF processing functions and low-PHY layer functions (e.g., fast Fourier transform (FFT), inverse FFT (iFFT), digital beamforming, and/or PRACH extraction and filtering) based at least in part on the lower layer functional split. Accordingly, in an O-RAN architecture, the RU(s) 1540 handle all over the air (OTA) communication with a UE 120, and real-time and non-real-time aspects of control and user plane communication with the RU(s) 1540 are controlled by the corresponding DU 1530, which enables the DU(s) 1530 and the CU 1510 to be implemented in a cloud-based RAN architecture.

As indicated above, FIG. 15 is provided as an example. Other examples may differ from what is described with regard to FIG. 15.

Figure 16:
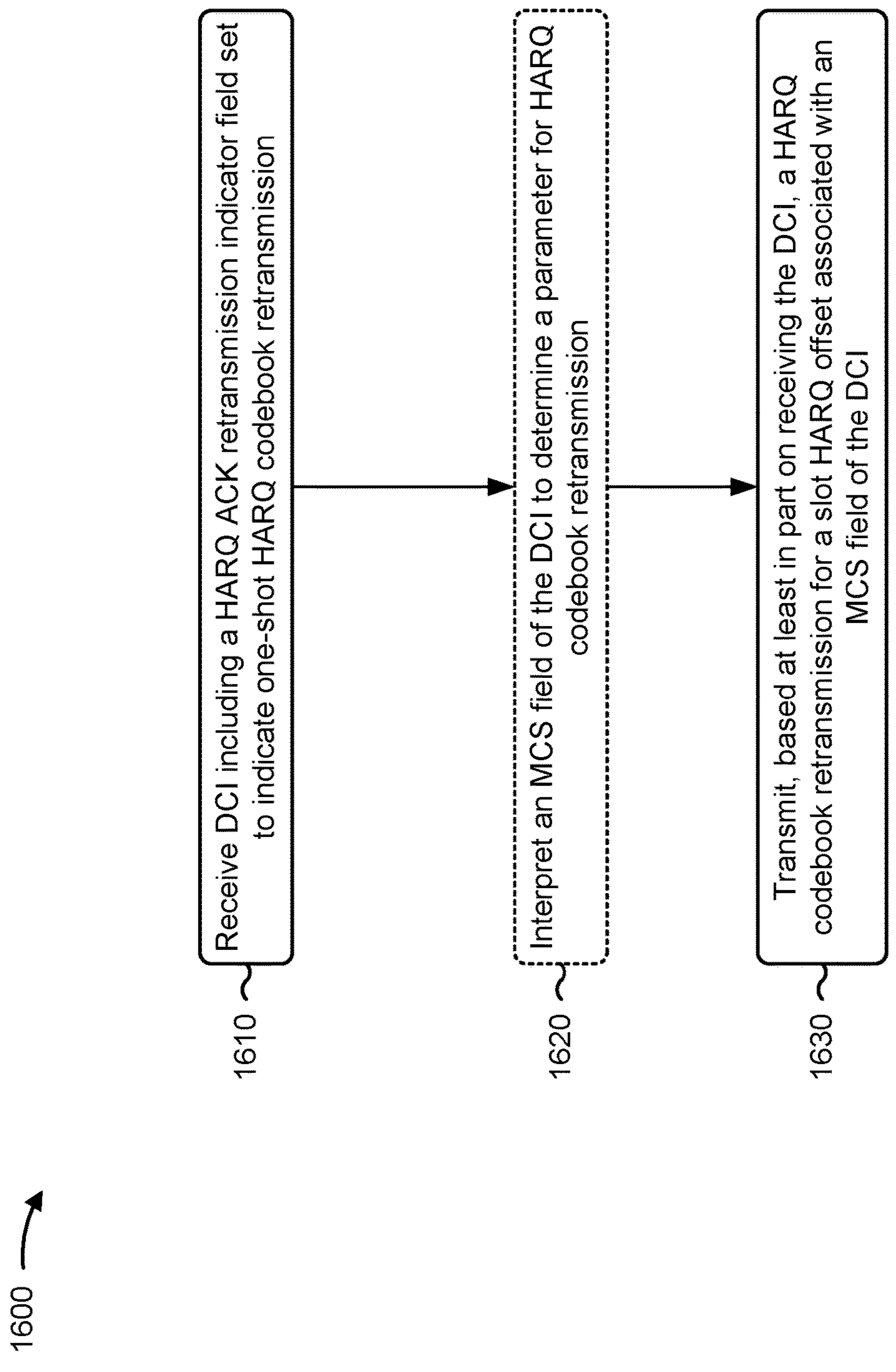
FIGS. 16-17 are diagrams illustrating example processes associated with using DCI for triggering HARQ codebook retransmission, in accordance with the present disclosure.

FIG. 16 is a diagram illustrating an example process 1600 performed, for example, by a UE, in accordance with the present disclosure. Example process 1600 is an example where the UE (e.g., UE 120) performs operations associated with using DCI for triggering HARQ codebook retransmission.

As shown in FIG. 16, in some aspects, process 1600 may include receiving DCI including a HARQ ACK retransmission indicator field set to indicate one-shot HARQ codebook retransmission (block 1610). For example, the UE (e.g., using communication manager 140 and/or reception component 902, depicted in FIG. 9) may receive DCI including a HARQ ACK retransmission indicator field set to indicate one-shot HARQ codebook retransmission, as described above.

As shown in FIG. 16, in some aspects, process 1600 may include interpreting an MCS field of the DCI to determine a parameter for HARQ codebook retransmission (block 1620). For example, the UE (e.g., using communication manager 140 and/or HARQ configuration component 908, depicted in FIG. 9) may interpret fields of the DCI to determine a parameter for HARQ codebook retransmission, as described above.

As further shown in FIG. 16, in some aspects, process 1600 may include transmitting, based at least in part on receiving the DCI, a HARQ codebook retransmission for a slot HARQ offset associated with the MCS field of the DCI (block 1630). For example, the UE (e.g., using communication manager 140 and/or transmission component 904, depicted in FIG. 9) may transmit, based at least in part on receiving the DCI, a HARQ codebook retransmission for a slot HARQ offset associated with another field of the DCI, as described above. In other words, the HARQ codebook retransmission is of HARQ transmissions associated with HARQ processes identified based at least in part on the HARQ slot offset. For example, the HARQ slot offset may indicate a particular slot for which canceled HARQ transmissions are to be retransmitted.

Process 1600 may include additional aspects, such as any single aspect or any combination of aspects described below and/or in connection with one or more other processes described elsewhere herein.

In a first aspect, the received DCI is associated with a first monitoring occasion, and process 1600 includes forgoing monitoring for the DCI in one or more second monitoring occasions.

In a second aspect, alone or in combination with the first aspect, the MCS field is a 5 bit field.

In a third aspect, alone or in combination with one or more of the first and second aspects, the DCI includes a plurality of fields, wherein the plurality of fields includes an NDI field, an RV field, and a portion of a frequency domain resource allocation field or of an antenna port field.

In a fourth aspect, alone or in combination with one or more of the first through third aspects, the plurality of fields has a size of 5 bits.

In a fifth aspect, alone or in combination with one or more of the first through fourth aspects, a PDSCH is not scheduled in connection with the DCI.

In a sixth aspect, alone or in combination with one or more of the first through fifth aspects, process 1600 includes determining that the PDSCH is not scheduled based at least in part on a HARQ ACK codebook configuration associated with a set of fields of the DCI.

In a seventh aspect, alone or in combination with one or more of the first through sixth aspects, the PDSCH is scheduled based at least in part on a content of the DCI.

In an eighth aspect, alone or in combination with one or more of the first through seventh aspects, process 1600 includes processing at least one of a physical uplink control channel resource field, a timing field, an antenna port field, or a combination thereof of the DCI based at least in part on a configuration for Type-3 HARQ codebook triggering.

In a ninth aspect, alone or in combination with one or more of the first through eighth aspects, process 1600 includes transmitting a physical uplink control channel based at least in part on the configuration for Type-3 HARQ codebook triggering and in accordance with the set of fields of the DCI.

In a tenth aspect, alone or in combination with one or more of the first through ninth aspects, the UE is operating in a triggered HARQ codebook retransmission mode.

In an eleventh aspect, alone or in combination with one or more of the first through tenth aspects, process 1600 includes receiving a set of requests for HARQ codebook retransmission during a period of one or more slots, the UE storing one or more canceled HARQ codebook requests, and triggering a request for Type-3 HARQ codebook retransmission.

In a twelfth aspect, alone or in combination with one or more of the first through eleventh aspects, triggering the request for Type-3 HARQ codebook retransmission comprises transmitting the request for Type-3 HARQ codebook retransmission, and transmitting a consolidated response to the one or more canceled HARQ codebook requests based at least in part on transmitting the request for Type-3 HARQ codebook retransmission.

In a thirteenth aspect, alone or in combination with one or more of the first through twelfth aspects, transmitting the consolidated response comprises transmitting the consolidated response based at least in part on a received DCI.

Although FIG. 16 shows example blocks of process 1600, in some aspects, process 1600 may include additional blocks, fewer blocks, different blocks, or differently arranged blocks than those depicted in FIG. 16. Additionally, or alternatively, two or more of the blocks of process 1600 may be performed in parallel.

Figure 17:
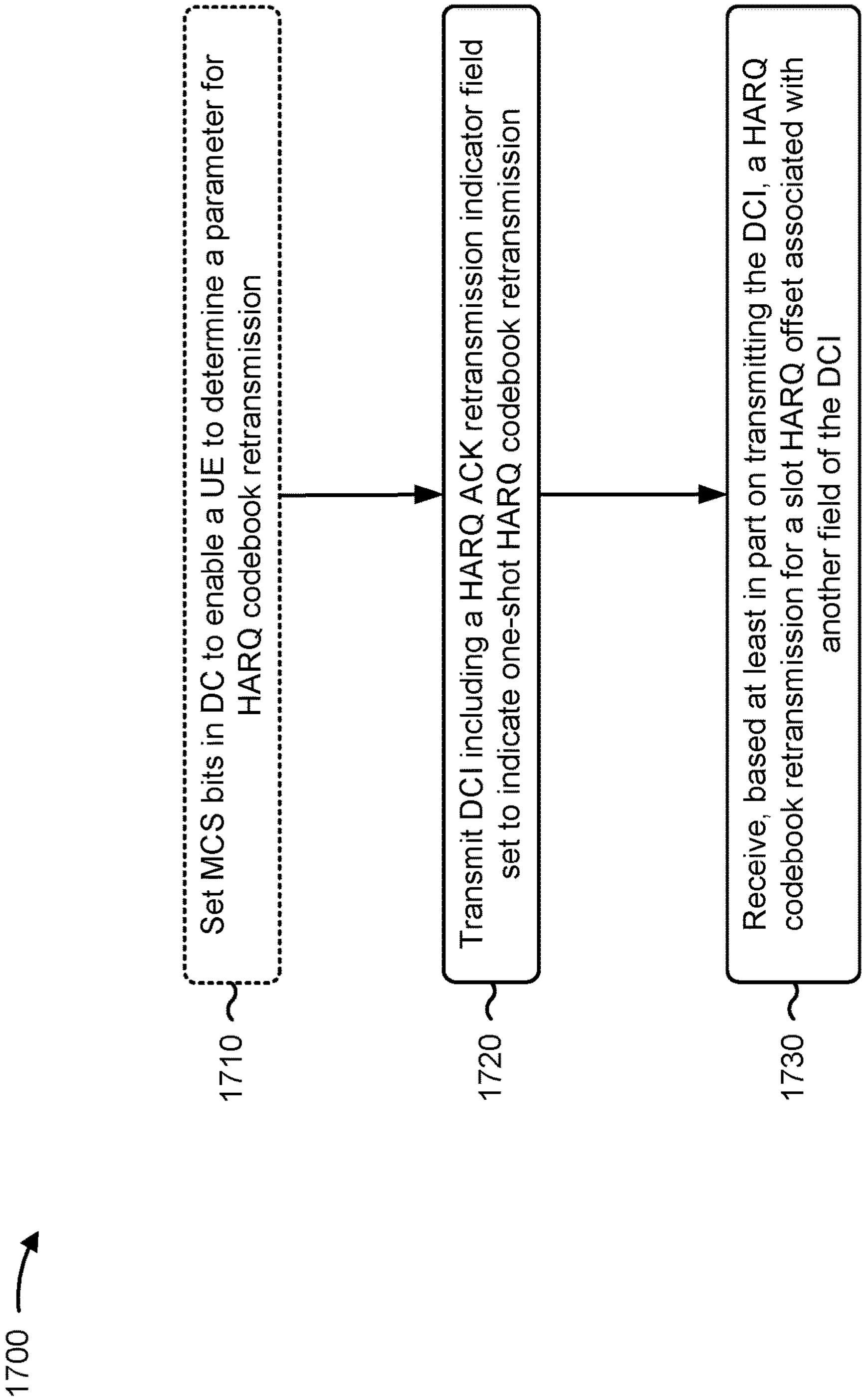

FIG. 17 is a diagram illustrating an example process 1700 performed, for example, by a network node, in accordance with the present disclosure. Example process 1700 is an example where the network node (e.g., network node 110) performs operations associated with using DCI to trigger HARQ codebook retransmission.

As shown in FIG. 17, in some aspects, the network node may set MCS bits in DCI to enable a UE to determine a parameter for HARQ codebook retransmission (block 1710). For example, the network node (e.g., using communication manager 150 and/or DCI configuration component 1208, depicted in FIG. 12) may set MCS bits in DCI to enable a UE to determine a parameter for HARQ codebook retransmission, as described above.

As further shown in FIG. 17, in some aspects, process 1700 may include transmitting DCI including a HARQ ACK retransmission indicator field set to indicate one-shot HARQ codebook retransmission (block 1720). For example, the network node (e.g., using communication manager 150 and/or transmission component 1204, depicted in FIG. 12) may transmit DCI including a HARQ ACK retransmission indicator field set to indicate one-shot HARQ codebook retransmission, as described above.

As further shown in FIG. 17, in some aspects, process 1700 may include receiving, based at least in part on transmitting the DCI, a HARQ codebook retransmission for a slot HARQ offset associated with another field of the DCI (block 1730). For example, the network node (e.g., using communication manager 150 and/or reception component 1202, depicted in FIG. 12) may receive, based at least in part on transmitting the DCI, a HARQ codebook retransmission for a slot HARQ offset associated with another field of the DCI, as described above.

Process 1700 may include additional aspects, such as any single aspect or any combination of aspects described below and/or in connection with one or more other processes described elsewhere herein.

In a first aspect, the transmitted DCI is associated with a first monitoring occasion, and process 1700 includes forgoing transmission of the DCI in one or more second monitoring occasions.

In a second aspect, alone or in combination with the first aspect, the MCS field is a 5 bit field.

In a third aspect, alone or in combination with one or more of the first and second aspects, the other field of the DCI includes a plurality of fields, wherein the plurality of fields includes an NDI field, an RV field, and a portion of a frequency domain resource allocation field or of an antenna port field.

In a fourth aspect, alone or in combination with one or more of the first through third aspects, the plurality of fields has a size of 5 bits.

In a fifth aspect, alone or in combination with one or more of the first through fourth aspects, a PDSCH is not scheduled in connection with the DCI.

In a sixth aspect, alone or in combination with one or more of the first through fifth aspects, process 1700 includes forgoing scheduling of the PDSCH in DCI based at least in part on a HARQ ACK codebook configuration associated with a set of fields of the DCI.

In a seventh aspect, alone or in combination with one or more of the first through sixth aspects, process 1700 includes setting at least one of a physical uplink control channel resource field, a timing field, an antenna port field, or a combination thereof of the DCI based at least in part on a configuration for Type-3 HARQ codebook triggering.

In an eighth aspect, alone or in combination with one or more of the first through seventh aspects, process 1700 includes receiving a physical uplink control channel based at least in part on the configuration for Type-3 HARQ codebook triggering and in accordance with the set of fields of the DCI.

In a ninth aspect, alone or in combination with one or more of the first through eighth aspects, the network node is communicating with a UE in a triggered HARQ codebook retransmission mode.

In a tenth aspect, alone or in combination with one or more of the first through ninth aspects, process 1700 includes transmitting a set of requests for HARQ codebook retransmission during a period of one or more slots, one or more canceled HARQ codebook requests being stored at a user equipment, and receiving, from the UE, a request for Type-3 HARQ codebook retransmission.

In an eleventh aspect, alone or in combination with one or more of the first through tenth aspects, receiving the request for Type-3 HARQ codebook retransmission comprises receiving the request for Type-3 HARQ codebook retransmission, and receiving a consolidated response to the one or more canceled HARQ codebook requests based at least in part on transmitting the request for Type-3 HARQ codebook retransmission.

In a twelfth aspect, alone or in combination with one or more of the first through eleventh aspects, receiving the consolidated response comprises receiving the consolidated response based at least in part on a transmitted DCI.

Although FIG. 17 shows example blocks of process 1700, in some aspects, process 1700 may include additional blocks, fewer blocks, different blocks, or differently arranged blocks than those depicted in FIG. 17. Additionally, or alternatively, two or more of the blocks of process 1700 may be performed in parallel.

The following provides an overview of some Aspects of the present disclosure:

Aspect 1: A method of wireless communication performed by a user equipment (UE), comprising: receiving downlink control information (DCI) including a hybrid automatic repeat request (HARQ) acknowledgement (ACK) retransmission indicator field set to indicate one-shot HARQ codebook retransmission; and transmitting, based at least in part on receiving the DCI, a HARQ codebook retransmission for a slot HARQ offset associated with another field of the DCI.

Aspect 2: The method of Aspect 1, wherein the other field of the DCI includes a modulation and coding scheme (MCS) field.

Aspect 3: The method of Aspect 2, wherein the MCS field is a 5 bit field.

Aspect 4: The method of any of Aspects 1 to 3, wherein the other field of the DCI includes a plurality of fields, wherein the plurality of fields includes a new data indicator (NDI) field, a redundancy version (RV) field, and a portion of a frequency domain resource allocation field or of an antenna port field.

Aspect 5: The method of Aspect 4, wherein the plurality of fields has a size of 5 bits.

Aspect 6: The method of any of Aspects 1 to 5, wherein a physical downlink shared channel (PDSCH) is not scheduled in connection with the DCI.

Aspect 7: The method of Aspect 6, further comprising: determining that the PDSCH is not scheduled based at least in part on a HARQ ACK codebook configuration associated with a set of fields of the DCI.

Aspect 8: The method of Aspect 7, wherein the PDSCH is scheduled based at least in part on a content of the DCI.

Aspect 9: The method of any of Aspects 6 to 7, further comprising: processing at least one of: a physical uplink control channel resource field, a timing field, an antenna port field, or a combination thereof of the DCI based at least in part on a configuration for Type-3 HARQ codebook triggering.

Aspect 10: The method of Aspect 9, further comprising: transmitting a physical uplink control channel based at least in part on the configuration for Type-3 HARQ codebook triggering and in accordance with the set of fields of the DCI.

Aspect 11: The method of any of Aspects 1 to 10, wherein the UE is operating in a triggered HARQ codebook retransmission mode.

Aspect 12: The method of any of Aspects 1 to 11, further comprising: receiving a set of requests for HARQ codebook retransmission during a period of one or more slots, the UE storing one or more cancelled HARQ codebook requests; and triggering a request for Type-3 HARQ codebook retransmission.

Aspect 13: The method of Aspect 12, wherein triggering the request for Type-3 HARQ codebook retransmission comprises: transmitting the request for Type-3 HARQ codebook retransmission; and transmitting a consolidated response to the one or more cancelled HARQ codebook requests based at least in part on transmitting the request for Type-3 HARQ codebook retransmission.

Aspect 14: The method of Aspect 13, wherein transmitting the consolidated response comprises: transmitting the consolidated response based at least in part on a received DCI.

Aspect 15: The method of Aspect 14, wherein the received DCI is associated with a first monitoring occasion, and further comprising: forgoing monitoring for the DCI in one or more second monitoring occasions.

Aspect 16: A method of wireless communication performed by a network node, comprising: transmitting downlink control information (DCI) including a hybrid automatic repeat request (HARQ) acknowledgement (ACK) retransmission indicator field set to indicate one-shot HARQ codebook retransmission; and receiving, based at least in part on transmitting the DCI, a HARQ codebook retransmission for a slot HARQ offset associated with another field of the DCI.

Aspect 17: The method of Aspect 16, wherein the other field of the DCI includes a modulation and coding scheme (MCS) field.

Aspect 18: The method of Aspect 17, wherein the MCS field is a 5 bit field.

Aspect 19: The method of any of Aspects 16 to 18, wherein the other field of the DCI includes a plurality of fields, wherein the plurality of fields includes a new data indicator (NDI) field, a redundancy version (RV) field, and a portion of a frequency domain resource allocation field or of an antenna port field.

Aspect 20: The method of Aspect 19, wherein the plurality of fields has a size of 5 bits.

Aspect 21: The method of any of Aspects 16 to 20, wherein a physical downlink shared channel (PDSCH) is not scheduled in connection with the DCI.

Aspect 22: The method of Aspect 21, further comprising: forgoing scheduling of the PDSCH in DCI based at least in part on a HARQ ACK codebook configuration associated with a set of fields of the DCI.

Aspect 23: The method of Aspect 22, further comprising: setting at least one of: a physical uplink control channel resource field, a timing field, an antenna port field, or a combination thereof of the DCI based at least in part on a configuration for Type-3 HARQ codebook triggering.

Aspect 24: The method of any of Aspects 22 to 23, further comprising: receiving a physical uplink control channel based at least in part on the configuration for Type-3 HARQ codebook triggering and in accordance with the set of fields of the DCI.

Aspect 25: The method of any of Aspects 16 to 24, wherein the network node is communicating with a user equipment in a triggered HARQ codebook retransmission mode.

Aspect 26: The method of any of Aspects 16 to 25, further comprising: transmitting a set of requests for HARQ codebook retransmission during a period of one or more slots, one or more cancelled HARQ codebook requests being stored at a user equipment; and receiving, from the user equipment, a request for Type-3 HARQ codebook retransmission.

Aspect 27: The method of Aspect 26, wherein receiving the request for Type-3 HARQ codebook retransmission comprises: receiving the request for Type-3 HARQ codebook retransmission; and receiving a consolidated response to the one or more cancelled HARQ codebook requests based at least in part on transmitting the request for Type-3 HARQ codebook retransmission.

Aspect 28: The method of Aspect 27, wherein receiving the consolidated response comprises: receiving the consolidated response based at least in part on a transmitted DCI.

Aspect 29: The method of Aspect 28, wherein the transmitted DCI is associated with a first monitoring occasion, and further comprising: forgoing transmission of the DCI in one or more second monitoring occasions.

Aspect 30: A method of wireless communication performed by a user equipment (UE), comprising: receiving downlink control information (DCI) including a hybrid automatic repeat request (HARQ) acknowledgement (ACK) retransmission indicator field set to indicate one-shot HARQ codebook retransmission; and transmitting, based at least in part on receiving the DCI, a HARQ codebook retransmission for a slot HARQ offset associated with another field of the DCI or an MCS field of the DCI.

Aspect 31: The method of Aspect 30, wherein the other field of the DCI includes a modulation and coding scheme (MCS) field.

Aspect 32: The method of Aspect 31, wherein the MCS field is a 5 bit field.

Aspect 33: The method of any of Aspects 30 to 32, wherein the other field of the DCI includes a plurality of fields, wherein the plurality of fields includes a new data indicator (NDI) field, a redundancy version (RV) field, and a portion of a frequency domain resource allocation field or of an antenna port field.

Aspect 34: The method of Aspect 33, wherein the plurality of fields has a size of 5 bits.

Aspect 35: The method of any of Aspects 30 to 34, wherein a physical downlink shared channel (PDSCH) is not scheduled in connection with the DCI.

Aspect 36: The method of Aspect 35, further comprising: determining that the PDSCH is not scheduled based at least in part on a HARQ ACK codebook configuration associated with a set of fields of the DCI.

Aspect 37: The method of Aspect 36, wherein the PDSCH is scheduled based at least in part on a content of the DCI.

Aspect 38: The method of any of Aspects 36 to 37, further comprising: processing at least one of: a physical uplink control channel resource field, a timing field, an antenna port field, or a combination thereof of the DCI based at least in part on a configuration for Type-3 HARQ codebook triggering.

Aspect 39: The method of Aspect 38, further comprising: transmitting a physical uplink control channel based at least in part on the configuration for Type-3 HARQ codebook triggering and in accordance with the set of fields of the DCI.

Aspect 40: The method of any of Aspects 30 to 39, wherein the UE is operating in a triggered HARQ codebook retransmission mode.

Aspect 41: The method of any of Aspects 30 to 40, further comprising: receiving a set of requests for HARQ codebook retransmission during a period of one or more slots; and triggering a request for Type-3 HARQ codebook retransmission.

Aspect 42: The method of Aspect 41, wherein triggering the request for Type-3 HARQ codebook retransmission comprises: transmitting the request for Type-3 HARQ codebook retransmission; and transmitting a consolidated response to the set of requests for HARQ codebook retransmission based at least in part on transmitting the request for Type-3 HARQ codebook retransmission.

Aspect 43: The method of Aspect 42, wherein transmitting the consolidated response comprises: transmitting the consolidated response based at least in part on a received DCI.

Aspect 44: The method of Aspect 43, wherein the received DCI includes a first field with a first value, and wherein a second value of a second field of the received DCI is interpreted based on the first value.

Aspect 45: A method of wireless communication performed by a network node, comprising: transmitting downlink control information (DCI) including a hybrid automatic repeat request (HARQ) acknowledgment (ACK) retransmission indicator field set to indicate one-shot HARQ codebook retransmission; and receiving, based at least in part on transmitting the DCI, a HARQ codebook retransmission for a slot HARQ offset associated with another field of the DCI or an MCS field of the DCI.

Aspect 46: The method of Aspect 45, wherein the other field of the DCI includes a modulation and coding scheme (MCS) field.

Aspect 47: The method of Aspect 46, wherein the MCS field is a 5 bit field.

Aspect 48: The method of any of Aspects 45 to 47, wherein the other field of the DCI includes a plurality of fields, wherein the plurality of fields includes a new data indicator (NDI) field, a redundancy version (RV) field, and a portion of a frequency domain resource allocation field or of an antenna port field.

Aspect 49: The method of Aspect 48, wherein the plurality of fields has a size of 5 bits.

Aspect 50: The method of any of Aspects 45 to 49, wherein a physical downlink shared channel (PDSCH) is not scheduled in connection with the DCI.

Aspect 51: The method of Aspect 50, further comprising: forgoing scheduling of the PDSCH in DCI based at least in part on a HARQ ACK codebook configuration associated with a set of fields of the DCI.

Aspect 52: The method of Aspect 51, further comprising: setting at least one of: a physical uplink control channel resource field, a timing field, an antenna port field, or a combination thereof of the DCI based at least in part on a configuration for Type-3 HARQ codebook triggering.

Aspect 53: The method of any of Aspects 45 to 52, further comprising: receiving a physical uplink control channel based at least in part on the configuration for Type-3 HARQ codebook triggering and in accordance with the set of fields of the DCI.

Aspect 54: The method of any of Aspects 45 to 53, wherein the network node is communicating with a user equipment in a triggered HARQ codebook retransmission mode.

Aspect 55: The method of any of Aspects 45 to 54, further comprising: transmitting a set of requests for HARQ codebook retransmission during a period of one or more slots; and receiving, from the user equipment, a request for Type-3 HARQ codebook retransmission.

Aspect 56: The method of Aspect 55, wherein receiving the request for Type-3 HARQ codebook retransmission comprises: receiving the request for Type-3 HARQ codebook retransmission; and receiving a consolidated response to the set of requests for HARQ codebook retransmission based at least in part on transmitting the request for Type-3 HARQ codebook retransmission.

Aspect 57: The method of Aspect 56, wherein receiving the consolidated response comprises: receiving the consolidated response based at least in part on a transmitted DCI.

Aspect 58: The method of Aspect 57, wherein the transmitted DCI is associated with a first monitoring occasion, and further comprising: forgoing transmission of the DCI in one or more second monitoring occasions.

Aspect 59: An apparatus for wireless communication at a device, comprising a processor; memory coupled with the processor; and instructions stored in the memory and executable by the processor to cause the apparatus to perform the method of one or more of Aspects 1-58.

Aspect 60: A device for wireless communication, comprising a memory and one or more processors coupled to the memory, the one or more processors configured to perform the method of one or more of Aspects 1-58.

Aspect 61: An apparatus for wireless communication, comprising at least one means for performing the method of one or more of Aspects 1-58.

Aspect 61: A non-transitory computer-readable medium storing code for wireless communication, the code comprising instructions executable by a processor to perform the method of one or more of Aspects 1-58.

Aspect 61: A non-transitory computer-readable medium storing a set of instructions for wireless communication, the set of instructions comprising one or more instructions that, when executed by one or more processors of a device, cause the device to perform the method of one or more of Aspects 1-58.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
- one or more memories; and
- one or more processors coupled to the one or more memories, the one or more processors configured to cause the UE to:
  - receive downlink control information (DCI) that includes a hybrid automatic repeat request (HARQ) acknowledgement (ACK) retransmission indicator field set to indicate one-shot HARQ codebook retransmission;
  - transmit, based at least in part on the reception of the DCI, a HARQ codebook retransmission for a slot HARQ offset indicated by one or more fields of the DCI;
  - receive a set of requests for HARQ codebook retransmission in a period of one or more slots;
  - trigger, based at least in part on the DCI not scheduling a physical downlink shared channel (PDSCH) transmission, a request for Type-3 HARQ codebook retransmission; and
  - transmit a consolidated response to the set of requests for HARQ codebook retransmission.

2. The apparatus of claim 1, wherein the one or more fields of the DCI include a modulation and coding scheme (MCS) field, and wherein the MCS field is a 5 bit field.

3. The apparatus of claim 1, wherein the one or more fields of the DCI include a new data indicator (NDI) field, a redundancy version (RV) field, and a portion of a frequency domain resource allocation field or of an antenna port field.

4. The apparatus of claim 3, wherein the one or more fields of the DCI include a size of 5 bits.

5. The apparatus of claim 1,
- wherein the PDSCH is not scheduled in connection with the DCI.

6. The apparatus of claim 5, wherein the one or more processors are configured to cause the UE to:
- determine that the PDSCH is not scheduled based at least in part on a HARQ ACK codebook configuration associated with the one or more fields of the DCI; and
- forgo decoding of a field, of the one or more fields of the DCI, based at least in part on the determination that the PDSCH is not scheduled.

7. The apparatus of claim 6,
- wherein the PDSCH is scheduled based at least in part on a content of the DCI.

8. The apparatus of claim 6,
wherein the one or more processors are configured to cause the UE to:
process at least one of a physical uplink control channel resource field, a timing field, an antenna port field, or a combination thereof of the DCI based at least in part on a configuration to trigger Type-3 HARQ codebook transmission.

9. The apparatus of claim 8,
wherein the one or more processors are configured to cause the UE to:
transmit a physical uplink control channel based at least in part on the configuration to trigger Type-3 HARQ codebook transmission and in accordance with the one or more fields of the DCI.

10. The apparatus of claim 1, wherein the UE is in operation in a triggered HARQ codebook retransmission mode.

11. The apparatus of claim 1, wherein the one or more processors, when configured to cause the UE to trigger the request for Type-3 HARQ codebook retransmission, are configured to cause the UE to:
transmit the request for Type-3 HARQ codebook retransmission; and
transmit the consolidated response to the set of requests for HARQ codebook retransmission based at least in part on the transmission of the request for Type-3 HARQ codebook retransmission.

12. The apparatus of claim 11,
wherein the one or more processors, when configured to transmit the consolidated response, are configured to cause the UE to:
transmit the consolidated response based at least in part on the DCI.

13. The apparatus of claim 12,
wherein the received DCI includes a first field with a first value, and wherein a second value of a second field of the received DCI is interpreted based on the first value.

14. An apparatus for wireless communication at a network node for wireless communication, comprising:
one or more memories; and
one or more processors coupled to the one or more memories, the one or more processors configured to cause the network node to:
transmit downlink control information (DCI) that includes a hybrid automatic repeat request (HARQ) acknowledgement (ACK) retransmission indicator field set to indicate one-shot HARQ codebook retransmission;
receive, based at least in part on the transmission of the DCI, a HARQ codebook retransmission for a slot HARQ offset indicated by one or more fields of the DCI;
transmit a set of requests for HARQ codebook retransmission in a period of one or more slots; and
receive a consolidated response to the set of requests for HARQ codebook retransmission, wherein the consolidated response is associated with a Type-3 HARQ codebook retransmission, wherein the Type-3 HARQ codebook retransmission is based at least in part on the DCI not scheduling a physical downlink shared channel (PDSCH) transmission.

15. The apparatus of claim 14, wherein the one or more fields of the DCI include a modulation and coding scheme (MCS) field, and wherein the MCS field is a 5 bit field.

16. The apparatus of claim 14, wherein the one or more fields of the DCI include a new data indicator (NDI) field, a redundancy version (RV) field, and a portion of a frequency domain resource allocation field or of an antenna port field.

17. The apparatus of claim 16, wherein the one or more fields of the DCI include a size of 5 bits.

18. The network node of claim 14,
wherein the PDSCH is not scheduled in connection with the DCI.

19. The apparatus of claim 18,
wherein the one or more processors are configured to cause the network node to:
forgo a scheduling of the PDSCH in the DCI based at least in part on a HARQ ACK codebook configuration associated with the one or more fields of the DCI.

20. The apparatus of claim 19,
wherein the one or more processors are configured to cause the network node to:
set at least one of a physical uplink control channel resource field, a timing field, an antenna port field, or a combination thereof of the DCI based at least in part on a configuration to trigger Type-3 HARQ codebook transmission.

21. The apparatus of claim 20,
wherein the one or more processors are configured to cause the network node to:
receive a physical uplink control channel based at least in part on the configuration to trigger a Type-3 HARQ codebook transmission and in accordance with the one or more fields of the DCI.

22. The apparatus of claim 14,
wherein the apparatus is configured to cause the network node to communicate with a user equipment in a triggered HARQ codebook retransmission mode.

23. The apparatus of claim 14,
wherein the one or more processors are configured to cause the network node to:
transmit a set of requests for HARQ codebook retransmission in a period of one or more slots; and
receive a request for Type-3 HARQ codebook retransmission based at least in part on the transmission of the set of requests for HARQ codebook retransmission in the period of one or more slots.

24. The apparatus of claim 23,
wherein the one or more processors, when configured to receive the request for Type-3 HARQ codebook retransmission, are configured to cause the network node to:
receive the request for Type-3 HARQ codebook retransmission; and
receive a consolidated response to the set of requests for HARQ codebook retransmission based at least in part on the transmission of the request for Type-3 HARQ codebook retransmission.

25. The apparatus of claim 24,
wherein the one or more processors, when configured to receive the consolidated response, are configured to cause the network node to:
receive the consolidated response based at least in part on the DCI.

26. An apparatus for wireless communication at a user equipment (UE), comprising:

one or more memories; and one or more processors coupled to the one or more memories, the one or more processors configured to cause the UE to:

receive downlink control information (DCI) that includes a hybrid automatic repeat request (HARQ) acknowledgement (ACK) retransmission indicator field set to indicate one-shot HARQ codebook retransmission; and transmit, based at least in part on the reception of the DCI, a HARQ codebook retransmission for a slot HARQ offset associated with another field of the DCI, wherein the HARQ codebook retransmission is based at least in part on the DCI not scheduling a physical downlink shared channel (PDSCH) transmission.

27. The apparatus of claim 26, wherein the other field of the DCI includes a plurality of fields, wherein the plurality of fields includes a new data indicator (NDI) field, a redundancy version (RV) field, and a portion of a frequency domain resource allocation field or of an antenna port field.

28. An apparatus for wireless communication at a network node, comprising:

one or more memories; and one or more processors coupled to the one or more memories, the one or more processors configured to cause the network node to:

transmit downlink control information (DCI) that includes a hybrid automatic repeat request (HARQ) acknowledgement (ACK) retransmission indicator field set to indicate one-shot HARQ codebook retransmission; and receive, based at least in part on the transmission of the DCI, a HARQ codebook retransmission for a slot HARQ offset associated with another field of the DCI, wherein the HARQ codebook retransmission is based at least in part on the DCI not scheduling a physical downlink shared channel (PDSCH) transmission.

29. The apparatus of wireless communication of claim 28, wherein the other field of the DCI includes a plurality of fields, wherein the plurality of fields includes a new data indicator (NDI) field, a redundancy version (RV) field, and a portion of a frequency domain resource allocation field or of an antenna port field.

* * * * *